(12) United States Patent
Sabin

(10) Patent No.: US 11,899,345 B1
(45) Date of Patent: Feb. 13, 2024

(54) ANTI-GLARE APPARATUS AND PROTECTOR AGAINST INCLEMENT WEATHER, WEARABLE CAMERA FOR ACTION CAMERAS AND OTHER PHOTOGRAPHIC DEVICES

(71) Applicant: Robert Sabin, Mill Neck, NY (US)

(72) Inventor: Robert Sabin, Mill Neck, NY (US)

( * ) Notice: Subject to any disclaimer, the term of this patent is extended or adjusted under 35 U.S.C. 154(b) by 0 days.

(21) Appl. No.: 18/224,876

(22) Filed: Jul. 21, 2023

(51) Int. Cl.
| | | |
|---|---|---|
| G03B 17/56 | (2021.01) | |
| H04N 23/66 | (2023.01) | |
| G03B 30/00 | (2021.01) | |
| G03B 11/04 | (2021.01) | |

(52) U.S. Cl.
CPC .......... G03B 17/565 (2013.01); G03B 11/045 (2013.01); G03B 17/561 (2013.01); G03B 17/563 (2013.01); G03B 17/566 (2013.01); G03B 30/00 (2021.01); H04N 23/66 (2023.01)

(58) Field of Classification Search
USPC .......................................................... 396/439
See application file for complete search history.

(56) References Cited

U.S. PATENT DOCUMENTS

| | | | |
|---|---|---|---|
| 2,369,829 | A | 2/1945 | Johnson |
| 4,541,698 | A | 9/1985 | Lemer |
| 5,546,099 | A | 8/1996 | Quint et al. |
| 5,822,636 | A | 10/1998 | Cho |
| 6,160,666 | A | 12/2000 | Rallison et al. |
| 7,095,025 | B2 | 8/2006 | Reilly et al. |
| 7,105,796 | B2 | 9/2006 | Lewis et al. |

(Continued)

FOREIGN PATENT DOCUMENTS

| | | | |
|---|---|---|---|
| CN | 2498621 Y | * | 7/2002 |
| CN | 204483180 U | | 7/2015 |

(Continued)

OTHER PUBLICATIONS

LCD Sun Shade (6 to 7 Inch); 2023, Wooden Camera; WoodenCamera. com—>>> https://woodencamera.com/collections/utility/products/lcd-sun-shade-6-to-7-inch.*

(Continued)

*Primary Examiner* — Clayton E. LaBalle
*Assistant Examiner* — Warren K Fenwick
(74) *Attorney, Agent, or Firm* — Alfred M. Walker

(57) ABSTRACT

A telescoping, anti-glare, weather-resistant, opaque, corrugated, compressible and retractable pipe shield blocks glare on smartphone or wearable action camera viewing screens. The pipe shield totally blocks glare on the display screen in real-time, moment to moment. To protect the camera from weather elements, the camera is inserted in a holding frame. The camera holding frame is mounted upon a handheld camera grip, adjacent to the distal end of the flexible pipe shield. The pipe shield may be extended or retracted via its corrugated folds. Optionally, a user-worn headband holds a cantilevered frame supporting a wearable action camera, adjacent to the distal end of the opaque, tubular, corrugated pipe shield, before the user's eyes. The user can record videos and stills during athletic or recreational activities, such as mountain climbing or skateboarding. The smartphone camera or the wearable action camera is activated by hand-controlled Bluetooth/Wi-Fi signals or via voice activation software.

28 Claims, 10 Drawing Sheets

(56) References Cited

U.S. PATENT DOCUMENTS

| | | | |
|---|---|---|---|
| 7,186,159 | B1 | 3/2007 | Baxter |
| 8,342,758 | B2 | 1/2013 | Braithwaite |
| 11,039,651 | B1 | 6/2021 | Bosworth |
| 2012/0050144 | A1 | 3/2012 | Morlock |
| 2012/0175394 | A1 | 7/2012 | Keune |
| 2014/0104692 | A1 | 4/2014 | Bickerstaff et al. |
| 2015/0323617 | A1* | 11/2015 | Ziarati .................. G01R 33/42 324/318 |
| 2015/0358515 | A1 | 12/2015 | Resnick et al. |
| 2018/0017796 | A1 | 1/2018 | Toso |
| 2018/0059355 | A1* | 3/2018 | Schorman .............. G03B 11/00 |
| 2020/0336582 | A1 | 10/2020 | Garcia-Sanchez |

FOREIGN PATENT DOCUMENTS

| | | | |
|---|---|---|---|
| CN | 204948133 U | | 1/2016 |
| CN | 218917759 U | * | 4/2023 |
| DE | 202006016501 U1 | | 12/2006 |
| HR | P20170586 A2 | | 10/2018 |

OTHER PUBLICATIONS

"5x5x4" Downspout Tile Adapter." Gutterworks Mfg Inc., www.gutterworks.com/shop-online/5-x5-x4-pvc-downspout-tile-adapter. 2023.
"Action Camera." Wikipedia, Wikimedia Foundation, Mar. 1, 2023, en.wikipedia.org/wiki/Action_camera.
Amazon.Com: +VW Amarok Accessories—Phone Holder, www.amazon.com/VW-Amarok-Accessories-Holder-phones/product-reviews/B01KYQTHO4/. 2023.
Amazon.Com: Dryer Vent Hose, 6" Insulated Flexible Duct 8ft with 2 Duct Clamps, Heavy-Duty Three Layer Protection for HVAC Ventilation, Duct Fan Systems, www.amazon.com/Insulated-Flexible-Heavy-Duty-Protection-Ventilation/dp/B09ZPH5R2L. 2023.
Bonk, Lawrence. "How to Minimize Glare on Digital Camera Display: Fix Camera LCD Glare." Gadget Review, Jul. 26, 2022, www.gadgetreview.com/how-to-minimize-glare-on-digital-camera-display# :~:text=KEY%20TAKEAWAYS%3A%201%20When%20sunlight%20becomes%20so%20harsh,anti-glare%20screen%20protector%20or%20a%20digital%20display%20shade.
Cox, Shanoon. "Top 10 Best Video Holder Stabilizers for iPhone." Wondershare, May 16, 2023, filmora.wondershare.com/video-editing-tips/best-video-stabilizers-for-iphone.html.
Eldridge, Michael. "Reducing Glare as a Workplace Safety Hazard." Safety Glasses USA, Sep. 16, 2015, www.safetyglassesusa.com/blog/reducing-glare-as-a-workplace-safety-hazard/.
"Flex-Drain." Ace Hardware, www.acehardware.com/search?filter=tenant~brand-name-attribute+eq+%27Flex-Drain%27. 2023.
"Glare (Vision)." Wikipedia, Wikimedia Foundation, Mar. 29, 2023, en.wikipedia.org/wiki/Glare_(vision).
"Gutter Downspout to Round Pipe Adapters." Aquabarrel.Com, www.aquabarrel.com/downspout-to-pipe-adapter-plastic-c-33_352_48downspout-to-round-pipe-adapter-p-1001398.html. 2023.
"Head Strap 2.0 (Action Camera Head Mount)." GoPro, gopro.com/en/us/shop/mounts-accessories/head-strap-2.0/ACHOM-002.html?clickId=4436368365&utm_campaign=159404&utm_content=8-12501&utm_medium=affiliate&utm_source=pepperjam. 2023.
Reland, Kay. "What to Do with the Glare on My Phone?" Techwalla, www.techwalla.com/articles/what-to-do-with-the-glare-on-my-phone. 2023.
Kiniulis, Karolis. "Mobile Photography Statistics (2023): Top 12 Facts." Eksposure, Mar. 29, 2023, www.eksposure.com/mobile-photography-statistics/.
"Learn More about Rain Bird and Our Smart Sprinkler Systems and Products." Rain Bird, store.rainbird.com/about. 2023.
O'Reilly, Quinton. "Screen Glare Is Always a Problem, but There Are Ways to Reduce It." TheJournal.Ie, Jun. 8, 2016, www.thejournal.ie/screen-glare-adjust-2809897-Jun2016/.
"Smartphone." Wikipedia, Wikimedia Foundation, Jul. 2, 2023, en.wikipedia.org/wiki/Smartphone.
Terrabloom Flexible 10 Inch Ducting—Amazon.Com, www.amazon.com/TerraBloom-Flexible-Inch-Ducting-Ventilation/dp/B09RQXHTB4. 2023.
"Wearable Cameras: 2023 Ultimate Guide." GoPro, gopro.com/en/us/news/ultimate-guide-to-wearable-cameras.
Knoptop. "POV Camera Phone Head Mount! DIY Rig." Instructables, May 3, 2018, www.instructables.com/DIY-Camera-Phone-Head-Mount-POV/.
Ci. "5 Head Cam Mounts for Hands-Free Iphone Videos-." iPhone-Ness, Nov. 2, 2018, www.iphoneness.com/lists/iphone-head-cam-mounts/.
FLEXAUST_T7_reinforced thermoplastic rubber hose with spring steel wire. 2023.
Hat Cam Hands Free Cellphone Camera Holder Clip Mount— Amazon.Com, www.amazon.com/Hands-Cellphone-Camera-Holder-Mount/dp/B01E25WFR4. 2023.
Zhiyun Smooth 4 3-Axis Handheld Gimbal Stabilizer for Smartphones—Adorama, www.adorama.com/zhsmooth4.html. 2023.
Amazon.com—smart stabilizer for mobile phones. 2023.
Ruchi Bahri. "Tips To Save Your Eyes From Smartphone Screen Glare". MobiGarage, Dec. 14, 2019.
Google definition of "Bluetooth". 2023.
Google definition of "Wi-Fi". 2023.
"Smove Mobile." Smove Mobile: Extendable Smartphone Stabilizer, smovemobile.com/. 2023.
Amerimax. Photo of L-shaped flexible pipe with adapter and dimensions. 2023.
FLEXAUST. 2021-2022 Product Catalog—Flexible Hose, Ducting, and Accessories.
NDS Store. 4-inch Corrugated Hub Adaptor 2023.
Bend-a-Drain Downspout Adaptor—4.25 in. x 3 in.—Advanced Drainage Systems—The Home Depot. 2023.
Amazon.com, Wooden Camera LCD Sun Shade for Monitors 6 to 7 inches, Jun. 29, 2016 Website catalog, 6 pages.

* cited by examiner

Fig. 4
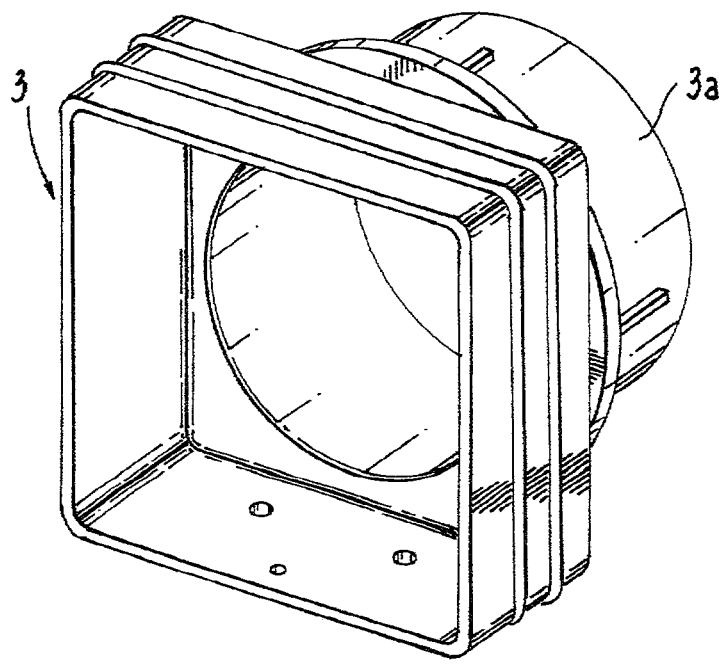
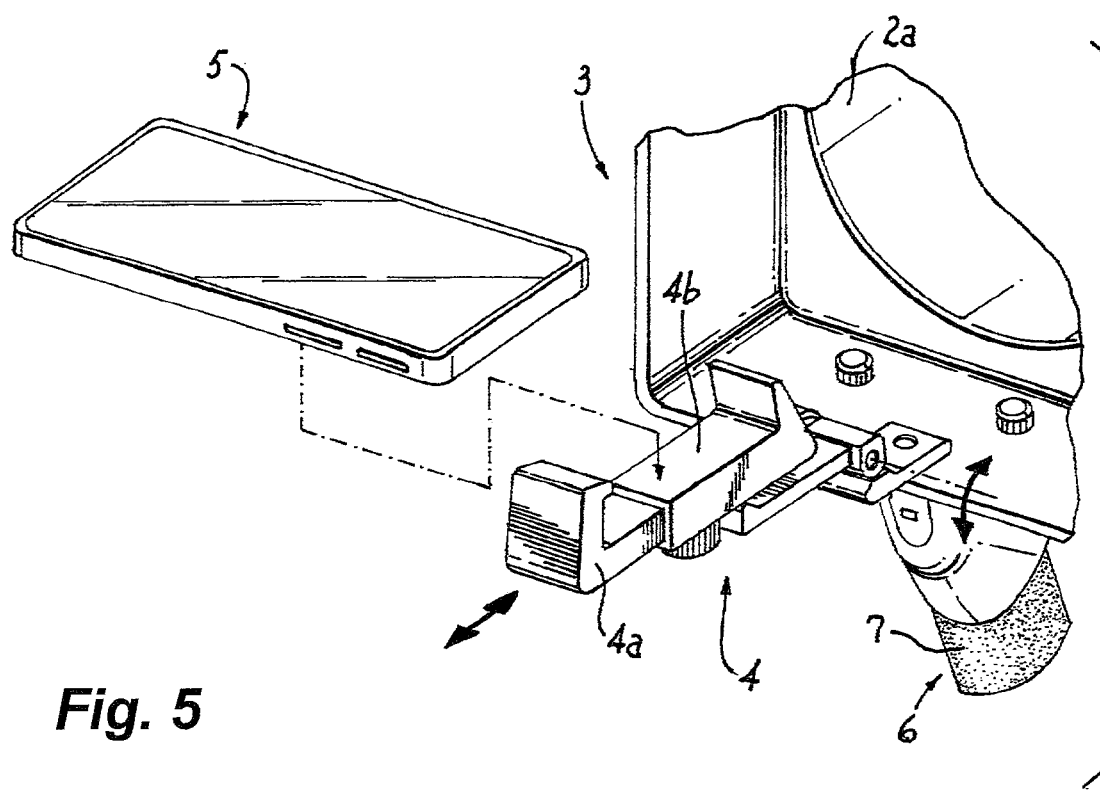
Fig. 5

ANTI-GLARE APPARATUS AND PROTECTOR AGAINST INCLEMENT WEATHER, WEARABLE CAMERA FOR ACTION CAMERAS AND OTHER PHOTOGRAPHIC DEVICES

FIELD OF THE INVENTION

The present invention relates to a glare-reducing tubular bellows housing supporting a camera phone therein at a distal end, where the bellows housing is attached to either a handheld support, or optionally attached cantilevered from a user's headband. The present invention also relates to a wearable camera mount for action cameras and other photographic devices.

BACKGROUND OF THE INVENTION

All references noted below are submitted in an Information Disclosure Statement and are intended to be included in their entirety as if reproduced in full as exhibits herein.

SafetyglassesUSA.com/blog discloses in "what is glare?" that "the International Commission on Illumination (CEI) defines glare as 'visual conditions in which there is excessive contrast or inappropriate distribution of light sources that disturb the observer or limits the ability to distinguish details and objects.' Wikipedia 'glare vision' discloses 'Glare is difficulty of seeing in the presence of bright light such as direct or reflected sunlight or artificial light such as car headlamps at night.' Because of this, some cars include mirrors with automatic and glare functions and in buildings, blinds or louvers are often used to protect occupants. Glare is caused by a significant ratio of luminance between the task (that which is being looked at) and glare sources. Factors such as the angle between the task and the glare source and eye adaption have significant impacts on the experience of glare."

Lawrence Bonk, on Jul. 26, 2022, in "Gadget Review", defines what glare is and why it is bad, disclosing the severe harmful destructive effects of glare relating to camera displays. He discloses, "glare is when sunlight is so bright and obtrusive that it becomes difficult to see anything at all." He also reveals ways to minimize the effects of glare with cameras, and obviously, smartphone screens, which can be improved upon.

The Applicant herein is a long term, avid flower and wildlife photographer who has dealt with glare on cameras and smartphones for over 43 years. Suffice it to say, glare is a severe problem with inadequate remedies.

As noted in "Digital camera sales dropped by 87% by 2010" and in other photography statistics, in 2017, of the 1.2 trillion photos taken, 85% of them were taken with smartphones (as also noted in the Wikipedia definition of "smartphone").

"Screen glare is always a problem but there are ways to reduce it" by Quinton O'Reilly discloses that screen glare is a pervasive problem with a few suggestions to ameliorate screen glare. These suggestions are to adjust positioning, invert colors, turn up brightness, and adjust display contrast.

Another way of reducing glare is disclosed by Kay Ireland, "What to do with glare on my phone" recommends a screen protector. A matte screen protector is recommended; however, the matte screen protector detracts from the quality on the display screen.

Another method disclosed in the art is a blue light filter which helps reduce sun glare on the display. Ruchi Bahri discloses in Mobi Garage "tips to save your eyes from Smartphone screen glare."

All the above methods to reduce screen glare are stop gap measures which do not thoroughly and deeply reduce glare and maintain display quality.

Shannon Cox discloses top ten video holder stabilizers for the iPhone. None of the ten video holder stabilizers do anything to counter glare.

Amazon discloses over 21 smartphone handheld stabilizers, none of which block glare.

There are many companies across the US who manufacture and sell plastic polypropylene, polycarbonate and PVC pipe and related accessories for farming, residential and commercial water drainage and gutter drainage, industrial uses, and more. AQUABARREL® in Gaithersburg, MD is one and RAIN BIRD® in Azusa, CA is another, and GUTTERWORKS®, Barnes City IA is another, Gutter Supply in Mundelein, Il 60060 is another.

FLEX-DRAIN® by RAIN BIRD® discloses, "flexible drainage pipe and fittings. The flexible drainpipe system is a revolutionary landscape drainage system for residential and commercial use and the newest brand of product from RAIN BIRD®. This unique pipe expands and flexes, making it perfect for tight spaces and curvy places".

Downspout tile adapters make the transition from rectangular downspouts or square downspouts to round underground drain tiles. For example, this is shown in the GUTTERWORKS® catalog of many downspout tile adapters and accessories. For example, Applicant herein uses "5×5×4" and 6×6×6 downspout tile adapters in his inventions. The first two numbers are the upper width and length, and the third number is the round pipe diameter below. There are several other downspout tile adapters and other combinations that could be used, such as 6×4×4, Applicant herein has chosen the best ones for efficacy and safety with high visibility for the photographer or daredevil with an action video recording camera.

Another corrugated hub adapter that can be used has 4¾ inches of spatial diameter in width. It fits right in the tube used as an opaque, corrugated, flexible pipe shield. Additionally, a 7-inch diameter snap adapter can be used instead of the 6×6×6 downspout adapter, as alternate embodiments.

While preferred embodiments of the flexible, expandable, opaque pipe are corrugated with folds and being tubular (i.e., cylindrical) in shape, the word "pipe" is not limited to being a "cylindrical" shape. Other geometric configurations for hollow, flexible pipes being square, triangular, polygonal or rectangular in cross section are also useful. In addition, the word "flexible" is not limited to "corrugated" and can apply to any hollow pipe material which is expandable and retractable, with or without corrugations.

Applicant's invention accomplishes virtually opaque, totally blocking glare on the LCD display screen and protecting the camera/smartphone/compact camera and other photographic devices from the elements. The Applicant herein believes the best way to eliminate glare is to eliminate the light striking the LCD or display screen on the smart phone, compact camera, head wearable action camera or other photographic equipment. The camera is surrounded by being mounted adjacent to the distal end of the opaque, corrugated, expandable and retractable pipe or preferably adjacent to the distal end of the downspout to round pipe adapters. The AQUABARREL® and GUTTERWORKS® websites each disclose a plethora of downspout adapters thought to be useful for the present invention. The Applicant herein uses a 2×3×4 flexible downspout adapter from FLEX-DRAIN®, or the flexible 4.25×3 inch BEND-A-DRAIN® "Expandable Small Downspout Adapter", for the wearable camera iteration of the invention. Both iterations have opaque, corrugated, expandable PVC in the middle.

The GOPRO® website defines wearable cameras in the "Wearable Cameras Ultimate 2023 GoPro Guide". While dimensions may vary, a typical GOPRO® camera has dimensions of 2.79-inch width×2.16-inch height×1.32-inch depth. Therefore, the camera is lightweight (5.4 ounces) and compact in size. The GOPRO® website identifies the wearable action camera as "GoPro", which can be provided with a corrugated opaque pipe, which is 9 inches long with a 4-inch round opening on one end followed by the camera at the distal end. The corrugated opaque pipe slips on and attaches to the round part of the downspout adapter by a clamp, screws, or built in tabs. The 9-inch-long iteration expands to 13.5 inches to custom fit the unique eye vision of each separate and distinct person. Clamp, screws, or the built in tabs attach the camera holder to the flexible, corrugated, compressible downspout adapter. The downspout adapter is extremely light weight and made of PVC polyethylene or polypropylene, like the RAIN BIRD® flexy drain material.

The Applicant herein has extensive experience with the corrugated flexible and compressible polyethylene polypropylene downspout adapters, having used it for decades on gutters, downspouts, drainage fields, cesspool leaching fields, and the like. The pipe is robust, light weight, tough, resists extreme cold and extreme heat, and maintains its shape and characteristics handily. The downspout adapters are widely available in the US at places like HOME DEPOT®, LOWES®, TRACTOR SUPPLY®, AMAZONS, agricultural supply houses, and the like. Millions of them are installed throughout the United States on residential and commercial housing, commercial and industrial uses and they are widely used in residential and commercial landscape, landscape, agriculture, and farming. The opaque, corrugated pipe is flexible and compressible, and may be extended toward the user or away from the user.

Wikipedia discloses an overview under the definition of Action Camera. "An action camera or action cam is a digital camera designed for recording action while being immersed in it. Action cameras are therefore typically compact, rugged, and waterproof at the surface level." Wikipedia op cit also discloses a number of companies manufacturing action cameras. "The category is commonly associated with the GOPRO® range of cameras, and many action cameras come with a GOPRO® mount adapter to take advantage of the accessories available for these cameras".

Besides the GOPRO® line, other manufacturers of action cams include. SONY®, GARMIN®, PANASONIC®, TOSHIBA®, POLAROID®, RICOH®, DJI OSMO ACTION®, and more.

GOPRO® discloses on Feb. 16, 2023, "Wearable Cameras: Ultimate 2023 GoPro Guide," point-of-view (POV) wearable camera information. What is a wearable camera? And other information.

GOPRO® op cit. discloses the a few of the best mounts for wearing a "GoPro" camera. These mounts include hand and wrist straps, chest body mounts, helmet front and side mounts, bite mouth mounts, and underwater floating camera case straps.

GOPRO® under "Mounts" discloses 30 different mounts. Including "Head Strap 2.0", which fits over the head point of view. The B&H PHOTO VIDEO® in Manhattan website has 14 pages of mounts for head wearable action cameras. The Head Strap 2.0 strap is the current state of the art for wearing an action camera on the helmet or head. It absolutely does not allow the eyeball to directly see what the camera sees. At best, it furnishes a point of view from the top of the head.

Among related patents include Chinese Patent No. CN 204483180U [Yang], which discloses headwear with a holder integrated with clamp arrangement for holding cell phones at eye level, with side curtains extending along visor (see Claims 1 and 3-4; FIGS. 1-3). See the head gear mounted camera with draping light glare shields of Chinese Patent CN 204483180 U of Feng Yang that only protect light glare from above or from the sides, unlike the present invention, which prevents light glare from substantially most of 360 degrees around the viewing screen of the camera being viewed.

German patent DE 202006016501U1 of Markus discloses protection against light radiation while handling a digital camera with a glare shield integrated into a cover overhead and serves as a protective cap (see Claims 1, 6 and 12; Element 11 in FIGS. 2-4, 6 and 17), unlike the present invention, which prevents light glare from substantially most of 360 degrees around the viewing screen of the camera being viewed.

Markus '501 also discloses draping walls from the peak of a camera user's hat, to shield the hand manipulated camera from sunshine, unlike the present invention, which prevents light glare from substantially most of 360 degrees around the viewing screen of the camera being viewed.

However, Markus '501 also only prevents light from above or from the side of the hand manipulated camera. It does nothing to stop light reflected upward from below, such as reflected upward from a concrete sidewalk or from the surface of a beach waterway below the user's camera.

2012/0050144 of Morlock discloses a head-mounted harness that holds position and orientation sensors in fixed position with blinders to prevent sun glare, when using a smartphone camera being held by the head-mounted harness (see Claims 1, 8, 11 and 14; Paragraphs [0068], [0072] and [0086]), unlike the present invention, which prevents light glare from substantially most of 360 degrees around the viewing screen of the camera being viewed.

2020/0336582 of Garcia-Sanchez discloses headgear with a visor opening for holding a personal communication device, including a camera with the lens positioned below the visor (see FIGS. 6-10; Claims 1-3 and 17-20; Paragraphs [0024]-[0028] and [0058]), unlike the present invention, which prevents light glare from substantially most of 360 degrees around the viewing screen of the camera being viewed.

2012/0175394 of Keune discloses a retaining device (1) for a mobile multimedia terminal (2) wherein head cover (3) comprises a baseball cap (see Claim 14). Keune also discloses mounting a cell phone camera from below the visor of a baseball cap, but with no glare shield protection from the sides or below the camera, unlike the present invention, which prevents light glare from substantially most of 360 degrees around the viewing screen of the camera being viewed.

SUMMARY OF THE INVENTION

A telescoping, anti-glare, weather-resistant apparatus is disclosed, which blocks display screen glare on smartphone camera viewing screens, on compact head wearable action cameras, and on mirrorless cameras and all other photographic equipment.

A telescoping action camera, known as "wearable" in the art, and other photographic equipment mount to aid in precise composition of pictures and video.

In the first embodiment, a hand-held mount for a Wi-Fi/Bluetooth actuator, similar to a camera mount, acts as a hand-held smartphone mount, mounted adjacent to the opaque, flexible, corrugated, bellows-type pipe shield.

Optionally, in a second embodiment a wearable action camera, such as a "GoPro" wearable action camera, is mounted cantilevered from the user's headband and the handheld actuator Wi-Fi/Bluetooth enabled device is mounted below the tubular bellows glare shield (or detached below) for Wi-Fi Bluetooth operation of the wearable action camera mounted outside of the distal end of flexible, opaque bellows glare shield, which is attached to the user's headband.

The telescoping, opaque, anti-glare, weather-resistant corrugated, bellows type expandable or retractable pipe shield blocks display screen glare on the wearable action camera for head mounted camera, or the smartphone camera mounted on a handheld stabilizer smartphone camera viewing screens. The pipe shield totally blocks glare on the display screen of either the smart phone camera or the wearable action camera.

To protect the camera from the weather elements, the smartphone camera or the wearable action camera is inserted in a clamp or other slide-in receptacle of a sturdy camera holder, such as camera holding frame. The blocked glare is 360 degrees from above from the sides and below the shielded viewing field of the user.

The camera holder may be an internal mounting camera holder within a distal end of the opaque tubular corrugated bellows type flexible pipe shield. Optionally, the camera holder can be an exterior camera holding frame which is mounted upon a handheld camera grip, adjacent to the distal end of the opaque tubular bellows type flexible pipe shield. In the action camera head worn embodiment or in the handheld camera embodiments, the pipe shield may be extended via its bellows-type corrugated folds, which are extendable toward the user or away from the user.

In the optional embodiment, a user-worn headband holds a cantilevered frame supporting the wearable action camera, adjacent to the distal end of an opaque tubular bellows type flexible pipe shield, before the eyes of the user, which may optionally include goggles for the user's viewing eyes. The user-worn headband with the opaque pipe shield enables the user to steadily move the user's head from side to side, or up and down, in steady motions, to produce clear wearable action camera videos or still photographs. The user is able to record videos during athletic or recreational activities, such as mountain climbing or skateboarding. The wearable action camera is activated by hand-controlled Bluetooth/Wi-Fi signals or via voice activation software.

Applicant's invention accomplishes totally blocking glare on the display screen of the handheld smartphone camera. To protect the camera from the weather elements, the smartphone camera is inserted in a clamp or other slide-in receptacle of a sturdy camera holding frame.

The camera holding frame is mounted upon a handheld camera grip, adjacent to the distal end of an opaque tubular bellows type flexible pipe shield, such as, but not limited to, a pipe such as manufactured under the tradename of FLEX-DRAIN®. The pipe is extremely lightweight and made out of polyethylene like the RAIN BIRD® flexy drain material. The pipe may be extended via its bellows-type folds, which are extendable toward the user or away from the user. The expanded bellows of the invention allow the photographer to exactly fit his eye prescription to the device by adjusting the compressible pipe in and out.

In an optional embodiment, a user-worn headband holds a cantilevered frame supporting a wearable action camera, such as a head worn "Go Pro" camera, or other wearable action video recording camera, adjacent to the distal end of an opaque, tubular, bellows type flexible pipe shield, before the eyes of the user, which may optionally include goggles for the user's viewing eyes. The opaque, tubular, flexible bellows pipe shield is also a tubular, expandable bellows screen shield that enables the user to steadily move the user's head from side to side, or up and down, in steady motions, to produce clear action camera videos or still photographs. The user is able to record videos during athletic or recreational activities, such as mountain climbing, skiing, or skateboarding.

Because the embodiment with the user-worn headband will be used in very rigorous sports such as skiing, snowboarding, cycling, skateboarding, skydiving and the like, a safety lasso small diameter cord is provided going from the apparatus around the neck, in a secure but safe release configuration, so that when the apparatus with the wearable action camera falls off the head of the user at 40 mph downhill skiing, or other fast rigorous activity, it is not lost.

In either embodiment, the smartphone camera, or the wearable action camera, is held in the camera holding frame located outside of the distal end of flexible, opaque bellows glare shield, which extends upward from a handheld camera grip or cantilevered forward from the headband base worn around the user's head, so that in either embodiment, the smartphone camera, or action video camera, is held eye level away from the face of the user. The camera grip mount can have access to on/off buttons for remotely activating still or video images on the smartphone camera. The grasping handle has actuating buttons, such as via Wi-Fi or Bluetooth, for operating the smartphone camera remotely with the user's hands.

Optionally, the smartphone camera or the wearable action camera, can be voice activated, such as via Android Google Access @software or via an Apple iPhone Voice Control @software.

To reduce glare that interferes with viewing images on a smartphone camera screen in direct sunlight, the tubular, opaque, flexible bellows shield blocks sunlight from 360 degrees, whether from above, from the sides, or reflected upward from a lower surface, such as light-colored cement surfaces or from reflecting water below the user. The shield reduces glare, which often makes it visually difficult to see the camera lens in broad daylight, in accordance with the disclosure provided.

In contrast to the prior art patents of Markus '501, Yang '180, and Keune '394, the novel 360-degree protection of the Applicant's tubular, opaque expandable bellows shield, which prevents glare from above and from the sides, it also prevents glare from behind the user, and also from bright light bouncing upward from light reflected up from a concrete sidewalk of from water at a beach toward the digital cellphone camera and therefore does not interfere with the glare protection of Applicant's viewing field toward the smartphone camera, or wearable action camera, where the user's viewing field is protected within the confines of the expandable and retractable tubular bellows glare shield, which keeps the images directed rearward from the smartphone camera or the wearable action camera within the camera holding mount glare-free for the user's viewing field.

In order for the invention to work, the user must survive the use and not be injured because of lack of visibility.

Therefore, in order to allow the user to see forward for safety reasons, a top portion of the inside of the tubular, opaque, flexible bellows shield must be unencumbered, so that the user can view the viewing area above the projected screen produced images from the smartphone camera or wearable action camera. Therefore, the viewing area is about double the size of the viewing screen alone.

Therefore, in general, the present invention is an apparatus/device for reducing glare in, and protecting, a camera against weather during use thereof. The apparatus includes:
   a) a camera holder, which may optionally be an interior mount within an opaque, flexible compressible pipe shield, or may be an exterior mounted camera holding frame having a front opening and a rear opening, and located adjacent to the distal end of the opaque flexible compressible pipe shield,
   b) wherein the camera holder has a clamp for supporting the camera either within the distal end of the opaque flexible compressible pipe shield, or within the camera holding frame located outside and adjacent to the distal end of the opaque flexible, compressible pipe shield, where the camera is located within the frame between the front and rear openings of the camera holding frame, or the camera is located in an internal mount located inside at the distal end of the opaque, flexible, compressible pipe shield thereof. The rear opening is adapted for accommodating a user to utilize the camera to photograph an object appearing on a viewing screen of the camera through the proximal rear opening of the frame.

The opaque, flexible and compressible pipe shield is attached at a distal end thereof to the opening of the camera holder, for reducing glare in the camera coming from all sides, while allowing the user to watch the viewing screen on the camera through a proximate end of the flexible pipe shield, and a viewing field extends from the proximate end of the pipe shield.

The viewing field includes both the viewing screen of the camera and an unobstructed viewing field surrounding the camera, so that the user has unobstructed views as the user moves forward while using the glare reducing apparatus/device.

The camera can be part of a smartphone or can be a wearable action camera.

The opaque flexible, compressible pipe shield is both expandable and compressible and is preferably corrugated. For example, it may be an opaque corrugated flexible and compressible polyethylene polypropylene downspout adapted for use with the camera.

The glare reducing apparatus may have a downwardly extending handle enabling a user to hold the frame while using said camera, such as where the handle incorporates a camera grip adjacent said distal end of said of the opaque, flexible, compressible pipe shield. The camera grip may include Wi-Fi/Bluetooth capability to activate taking still and video images with a smartphone camera.

In another embodiment, the frame and opaque, flexible, compressible pipe shield are mounted on a headband with a wearable action camera, which may have a microphone for voice activation of the Wi-Fi/Bluetooth capability, and for taking video.

BRIEF DESCRIPTION OF THE DRAWINGS

The present invention can best be understood in connection with the accompanying drawings. It is noted that the invention is not limited to the precise embodiments shown in the following drawings, in which:

FIG. 4 is a close-up detail view of the camera holding frame, enclosed adjacent to the distal end of the flexible, opaque compressible, corrugated bellows glare pipe shield.

FIG. 5 is a close-up detail view, showing by the directional arrow the insertion of the smartphone camera within the clamp or other side-in receptacle of the camera holding frame of FIG. 4.

FIG. 6 also shows a safety feature, shown from the user's viewpoint, looking into the flexible opaque bellows pipe glare-reducing shield, but showing the division of the user's viewing filed separated into three parts, namely an unencumbered viewing area through and outside of the viewing field, a middle layer for the smartphone camera and its built-in viewing screen, and a smaller unencumbered area under the smartphone camera, also for the view to look therethrough and outside of the viewing field.

FIG. 9 also shows a lasso-type tether to protect the camera from being lost if it is dislodged from the clamp of the distal frame. The tether is attached conveniently to the user's headband, or other wearable garment.

FIG. 14 also shows an action head mounted camera, such as a "GoPro" camera, or the like, mounted on a ledge outside of the circular field of view of $\overrightarrow{31/2}$ inches, so that when positioned on the ledge, the camera screen is visible in the lower sector of the 3.5 inch circular viewing field, but that the top of the action camera still leaves a wide open viewing area that is 2.1 inches in height, to provide the user/viewer with an unobstructed view of a sector of the circular viewing area above the top of the "GoPro" camera's display screen in real-time, moment to moment. There are dozens of other wearable mounts by major manufacturers and independent manufactures who manufacture wearable mounts for action cameras which do not allow the photographer to see exactly what he is getting. Examples are the chest mounts and arm mounts.

The colossal advantage of the present invention, is that the photographer can compose their pictures or video exactly the way he wants, exactly the way it is, viewing the exact precise scene or person.

When larger diameter pipe shields are used, then the wide-open viewing area will be more than the minimally safe open viewing area of 2.5 inches in height. For example, a connector piece for a 4-inch diameter pipe can have a 4.5-inch diameter at a larger flared opening, so that the unobstructed view above the top of the "GoPro" camera will be 3.1 inches in height, instead of 2.1 inches in height in the aforementioned 3.5-inch circular pipe.

Figure 15:
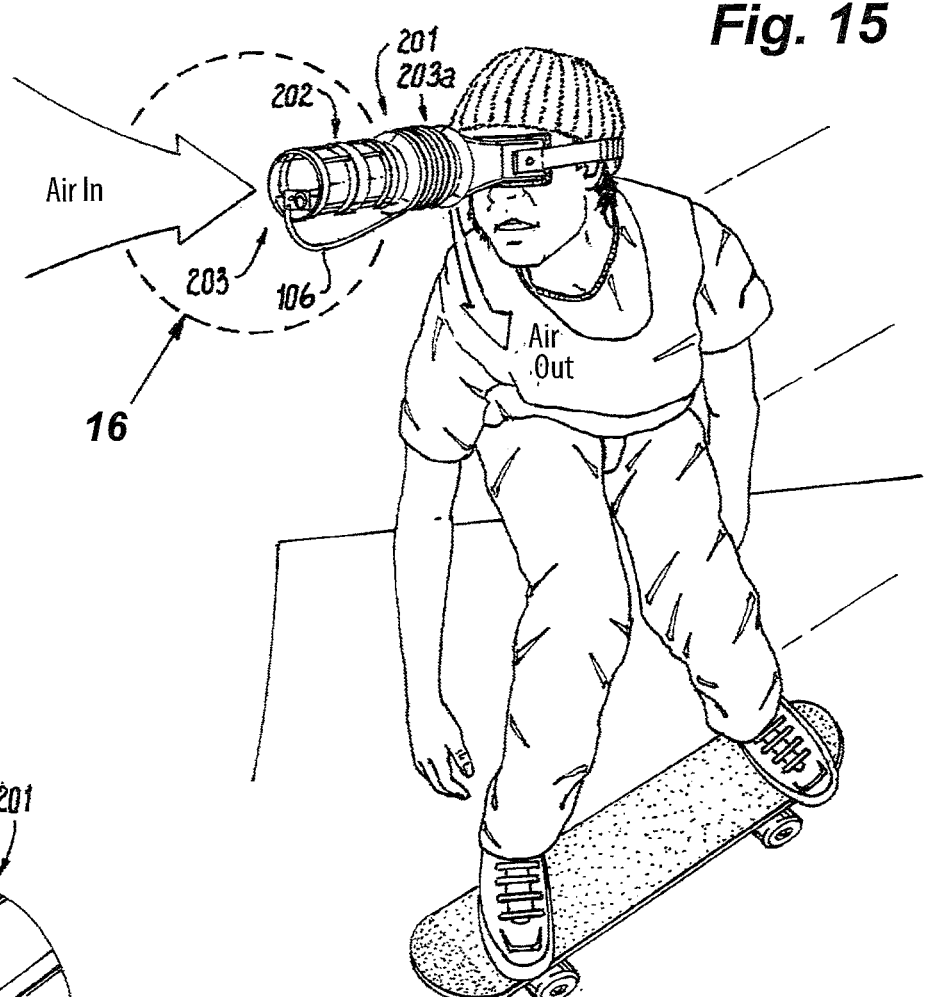

FIG. 15 is a perspective view of an alternate embodiment of a user conducting an on-going activity, such as skateboarding, user using the flexible, opaque bellows glare-reducing shield, having the wearable action camera being held within the distal end of the flexible, tubular, bellows-type corrugated pipe shield, while the skateboarder is moving on a skateboard and taking live action videos with the smartphone camera. The wearable action camera is activated for video imagery, prior to the activity and allowed to video until the activity is ceased. The video capturing can be controlled remotely via Wi-Fi or Bluetooth, with an activation finger operable button on the support post for the wearable action camera and glare-reducing reducing shield. Optionally the video imagery can be captured via voice commands. FIG. 15 also shows an air vent at the bottom of the tubular pipe shield to vent out fast incoming bursts of air while the user is traveling fast in a rigorous activity, such as skateboarding or skiing. FIG. 15 also shows that the pipe shield can be made of variable sections of corrugations to increase or decrease the length of the pipe shield.

Figure 16:
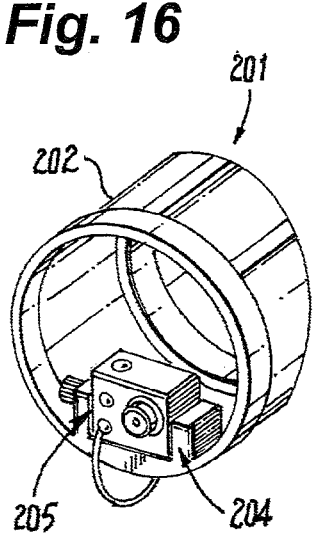

FIG. 16 is a close-up detailed view of the installation of the wearable action camera, located in the distal end of the tubular pipe shield, as shown in FIG. 15, in a skateboarding activity.

Figure 17:
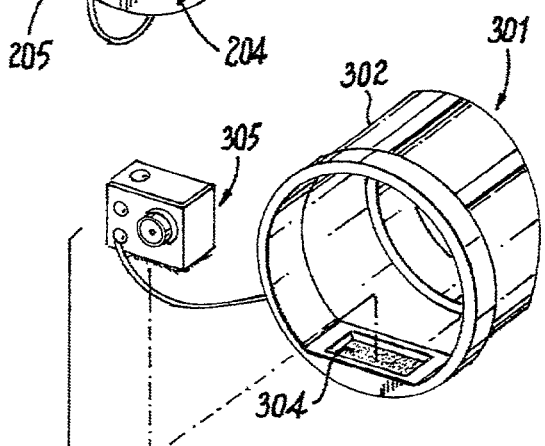

FIG. 17 is a close-up detailed view of an alternate embodiment, where the installation of the wearable action camera is located in the distal end of the tubular pipe shield, as shown in FIG. 15, in a skateboarding activity. But in FIG. 17, the wearable action camera is held in place by a simple fastener, such as a hook and loop fastener (i.e., VELCRO®), for less rigorous, slower activities, than in faster activities such as skateboarding or skiing, shown in FIG. 15.

Figure 18:
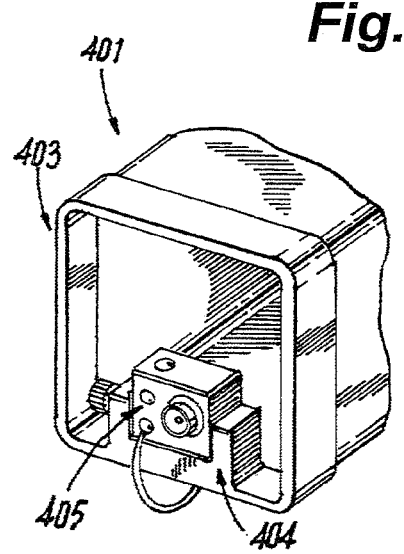

FIG. 18 is an alternate embodiment, where the flexible pipe shield has a noncylindrical cross section, such as a square cross section or other geometric cross-sectional shape.

Figure 19:
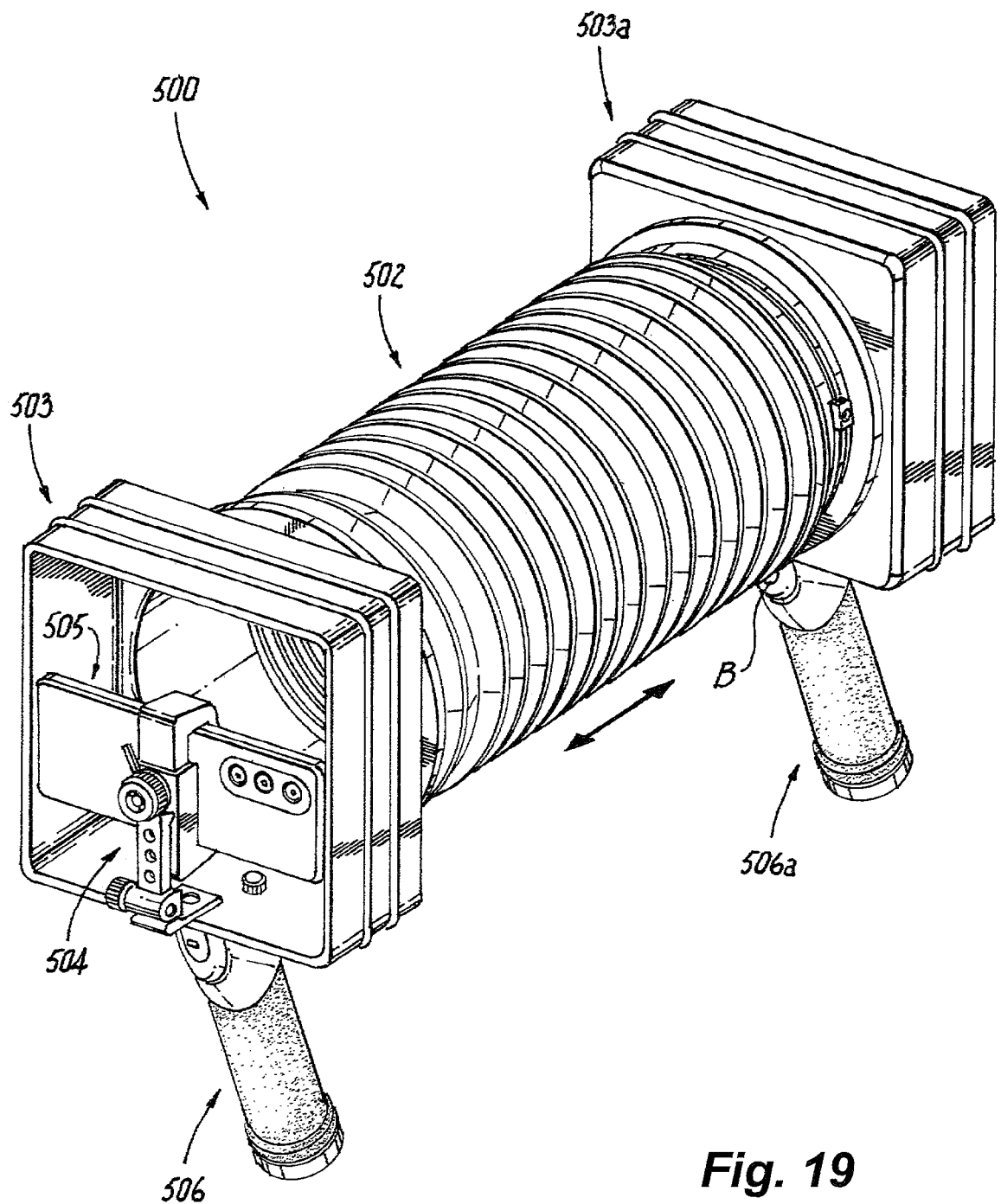

FIG. 19 is an alternate embodiment for using the handheld embodiment of FIGS. 1-7 herein, where the user wants to take a close-up photograph or video of a skittish or poisonous animal, such as a butterfly or snake. Therefore, in FIG. 19, a removably attachable handle, such as a camera grip, with a Bluetooth camera activation button is provided at the proximal end of the handheld glare reducing apparatus, spaced apart from the front of the apparatus, near the skittish or poisonous animal. While FIG. 19 shows the auxiliary proximal handle (such as a camera grip), near the body of the user, and the original distal handle (such as a camera grip), it is assumed that the device could have one or both handles either permanently attached or removably attached.

Figure 20:
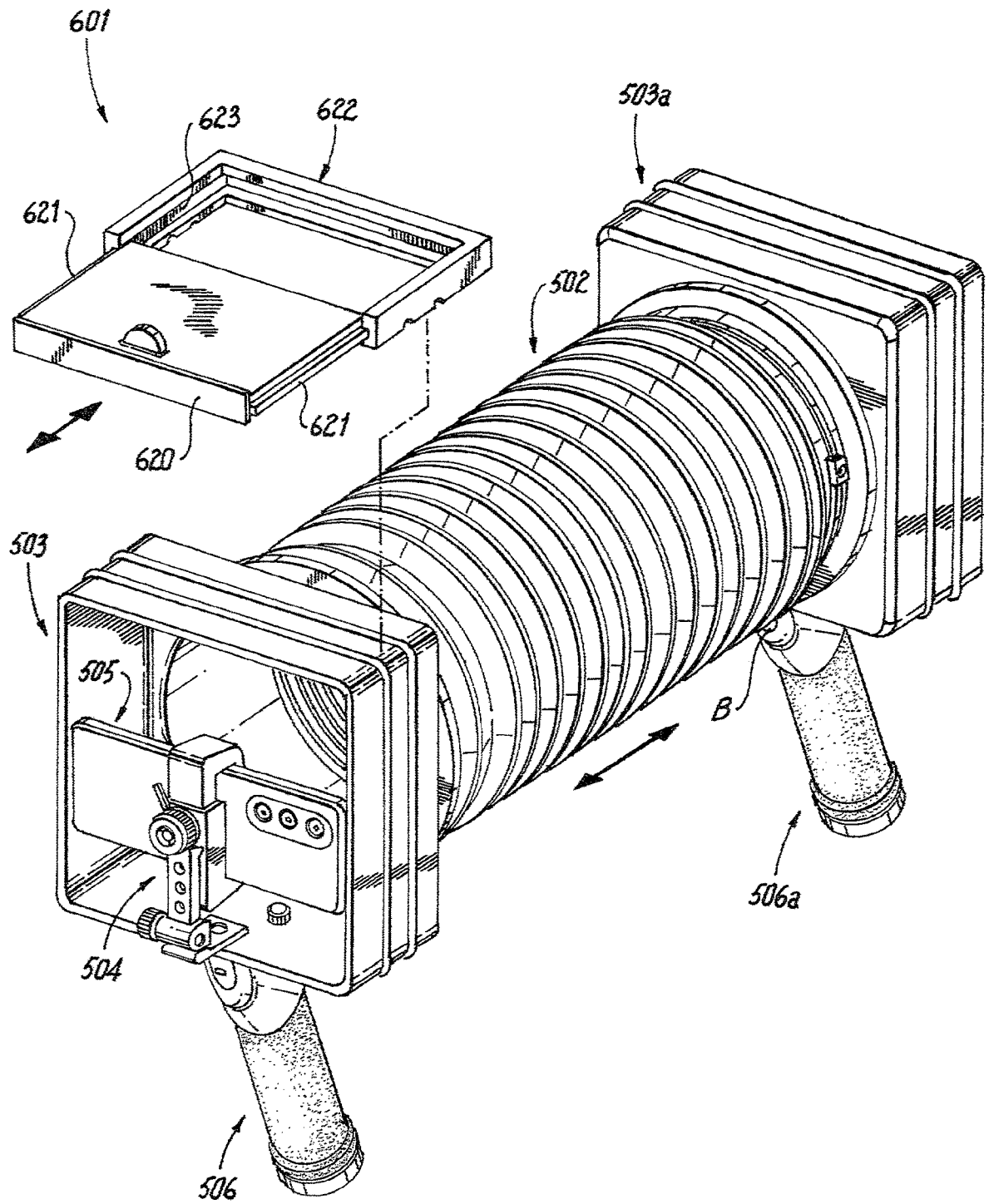

FIG. 20 is a perspective view of an auxiliary slidable, pivotable visor that can slide forward of the camera to block any direct sunlight near the location of the camera at the distal end of the opaque, flexible, compressible pipe shield, shown mounted upon the embodiment shown in FIG. 19.

DETAILED DESCRIPTION OF THE INVENTION

The present invention has broad applications to many technical fields for a variety of photographic applications. However, it is particularly adapted for use by a photographer hiking in a field for still images, or by a photographer wearing a wearable action video camera, and for illustrative purposes only, that preferred mode for carrying out the invention is described herein.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together, or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/ method.

Furthermore, any reference made throughout this specification to "one embodiment" or "an embodiment" means that a particular feature or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Figures 1, 2:
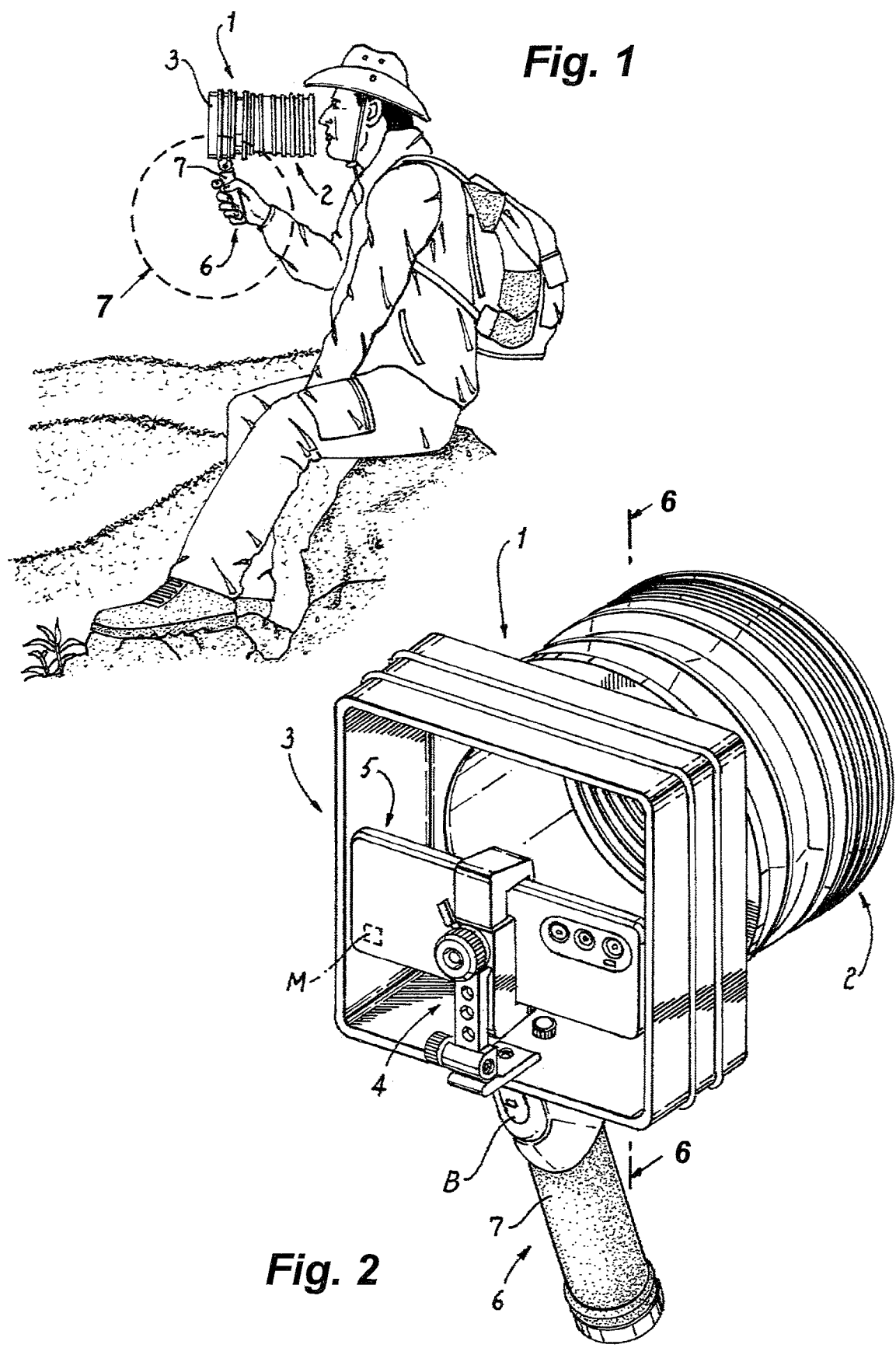
FIG. 1 is a perspective view of a hiker having an opaque flexible corrugated compressible bellows-type pipe shield in front of the hiker, with the opaque flexible corrugated compressible bellows-type pipe shield having outside its distal end a camera holder, such as a frame holding a smartphone camera, with a grasping handle of a camera grip provided beneath the smartphone camera, wherein the grasping handle has actuating buttons, such as Wi-Fi or Bluetooth, for operating the smartphone camera remotely with the user's hands. Optionally the smartphone camera can be voice activated, such as via Android Google Access @software or via an Apple iPhone Voice Control @software.
FIG. 2 is a close-up front view, showing the flexible, opaque, compressible, corrugated, bellows type glare pipe shield, adjacent to a frame holding the smartphone camera upon a hand operable camera grip post when the smartphone camera images are viewed by a user from the opposite side of the flexible, opaque, compressible, corrugated bellows glare pipe shield.

FIG. 1 shows a hiker having a glare reducing apparatus 1 including an opaque flexible bellows-type corrugated expandable and retractable pipe shield 2 in front of the hiker, with the flexible opaque bellows-type corrugated expandable and retractable pipe shield 2 having outside at its distal end a frame 3 having a clamp 4 holding a smartphone camera 5, with a grasping handle 6 of an upright camera grip post 7 provided beneath the smartphone camera 5, wherein the grasping handle 6 has actuating buttons B, such as Wi-Fi or Bluetooth, for operating the smartphone camera remotely with the user's hands. Optionally the smartphone camera 5 can be voice activated through a built-in microphone M, such as associated with Android Google Access @software or via an Apple iPhone Voice Control @software.

For proper fit, the flexible bellows-type corrugated expandable and retractable pipe shield 2 is secured to a collar 2a, where the collar 2a is attachable to the frame 3.

FIG. 2 shows the glare free apparatus 1 having the flexible, opaque bellows corrugated expandable and retractable pipe shield 2, collar 2a, adjacent to the frame 3 having a clamp 4 holding the smartphone camera 5 upon a handle 6 of the camera grip post 7, when the images of the smartphone camera 5 are viewed by a user from the opposite side of the flexible, opaque bellows corrugated expandable and retractable pipe shield.

Figure 3:
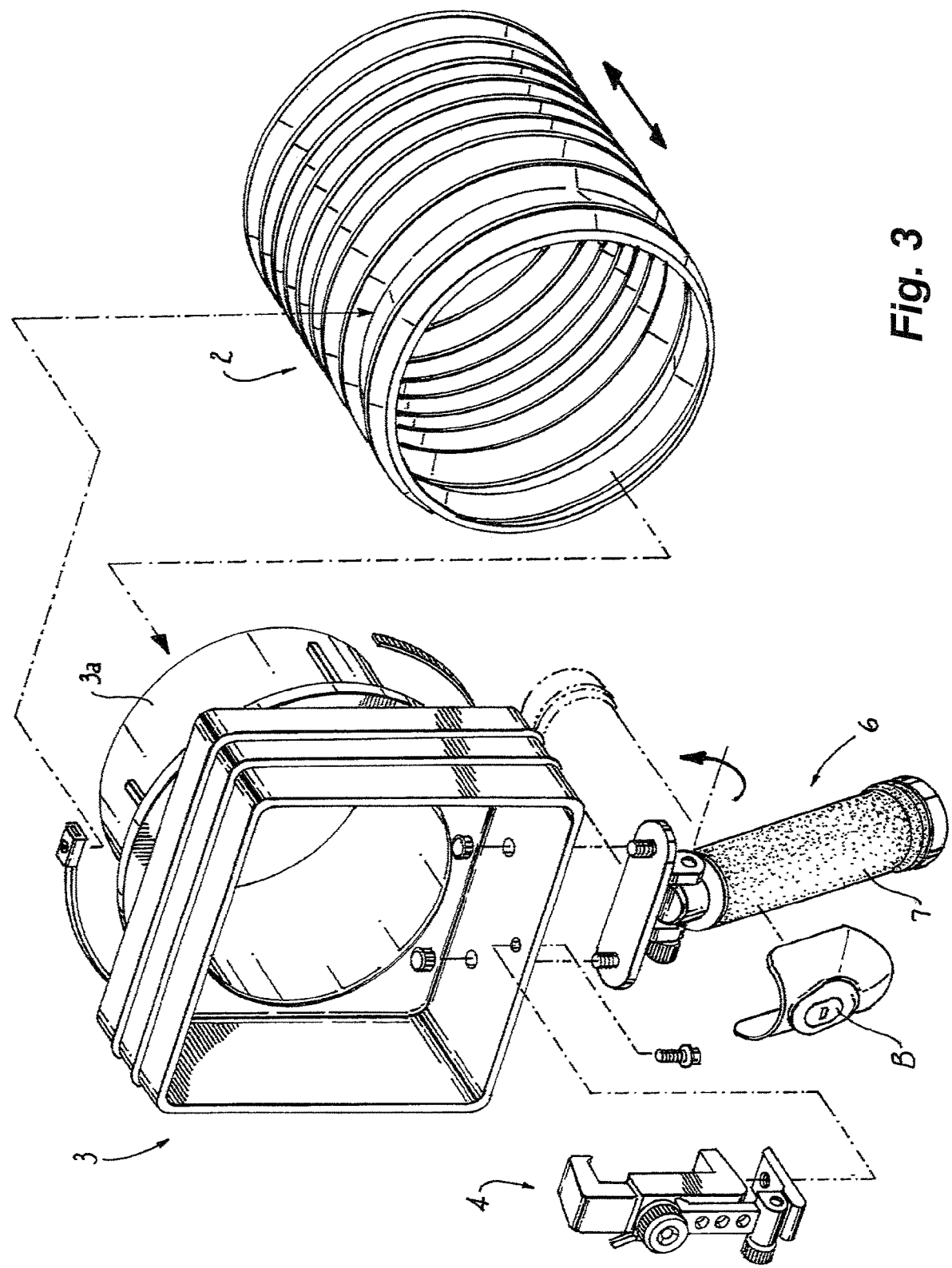
FIG. 3 is an exploded view of the components of FIGS. 1 and 2.

FIG. 3 shows an exploded view of the components of FIGS. 1 and 2, with a curved arrow showing that the handle 6 of the camera grip 7 is pivotable, to allow the user to position the glare free apparatus 1 in an optimal position for taking picture images or videos with the smartphone camera 5. The linear arrow shows the user's expansion and retraction of the flexible, opaque, corrugated pipe shield 2.

FIG. 4 shows in close-up detail view the camera holding frame 3 and collar 2a for attaching the distal end of the flexible, opaque bellows glare-reducing shield 2 to frame 3.

FIG. 5 shows showing by the zig-zagged dashed directional arrow the insertion of the smartphone camera 5 within the clamp 4 or other slide-in receptacle of the camera holding frame 3, provided adjacent to the collar 2a located at the distal end of the flexible, opaque bellows corrugated glare-reducing shield 2 of FIG. 4. The linear bidirectional arrow of Clamp 4 is slidably movable, where movable tongue portion 4a slides and nests within a corresponding hollow interior of stationary portion 4b of clamp 4. FIG. 5 also shows the curved bi-directional arrow indicating the pivoting upward of the camera-holding frame 3 away from the vertical axis of the handle 7 of the camera grip 6, so that upward extending camera scenes, such as nighttime stars in the sky, can be photographed with the smartphone camera 5.

Figure 6:
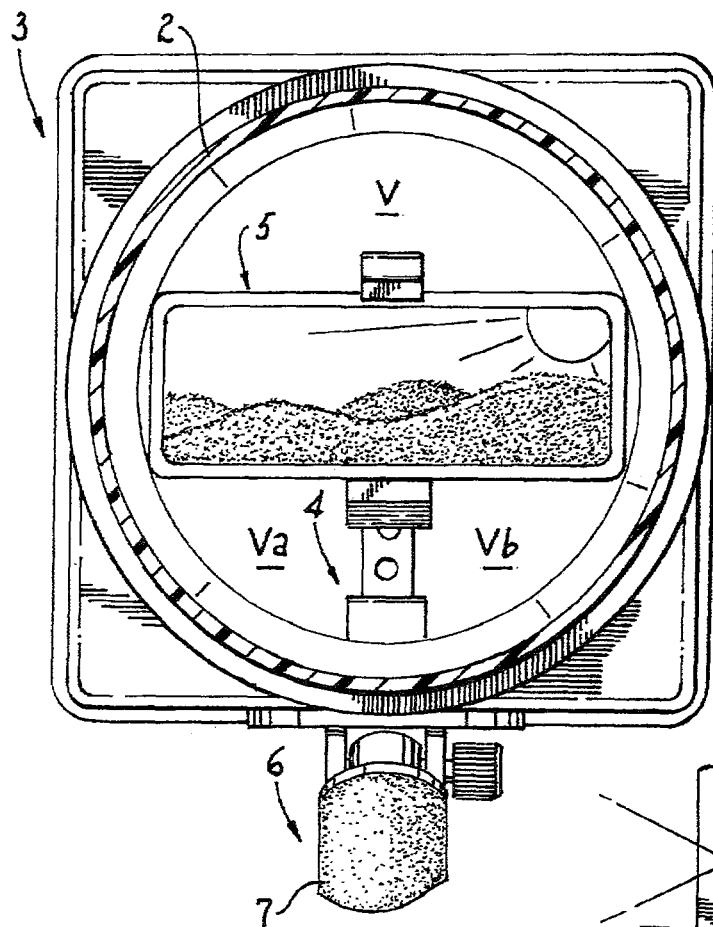
FIG. 6 is a rear view, shown from the user's viewpoint, looking into the flexible, opaque bellows corrugated glare-reducing shield and at the smartphone camera held within the camera holding frame, adjacent to the distal end of the opaque bellows corrugated a shield.

FIG. 6 shows the rear of the anti-glare apparatus 1 from the rear, showing the user's viewpoint, looking into the flexible, opaque bellows corrugated glare-reducing shield 2 and at the smartphone camera 5 being held within the camera holding frame 3 located adjacent to the distal end of the at the flexible, opaque bellows corrugated glare-reducing shield 2.

In order for the invention to work, the user must survive the use and not be injured because of lack of visibility through the viewing field of the circular flexible corrugated bellows-type pipe shield 5. Therefore, FIG. 6 also shows the rear of the anti-glare apparatus 1, showing the user's viewpoint, looking into the flexible opaque bellows pipe glare-reducing shield 2, but also shows the division of the user's viewing filed separated into three parts, namely an unencumbered viewing area "V" above and outside of the viewing field "Wa" of the screen of the smartphone camera 5, a middle layer for the viewing field "Wa" of the smartphone camera 5 and its built-in viewing screen, and a pair of smaller unencumbered viewing areas "Va" and "Vb", located under the smartphone camera 5, and separated by the clamp 4 of the frame 3, also for the viewer to look therethrough and outside of the viewing field "Wa" of the smartphone camera 5. FIG. 6 also shows width dimension "W" and height dimension "H" of the smartphone camera holding frame 3, as well as the height "Ha" of the unobstructed viewing area above the smartphone camera 5.

In a typical situation, the frame 3 supporting he flexible, corrugated pipe shield 2 is between 5 and 6 inches in diameter, to accommodate smartphones 5 with cameras, where the smartphone cameras 5 are between four and six inches in width when measured along their respective longest edges in the horizontal position of use for taking photographs, using the smartphone's camera.

Figure 7:
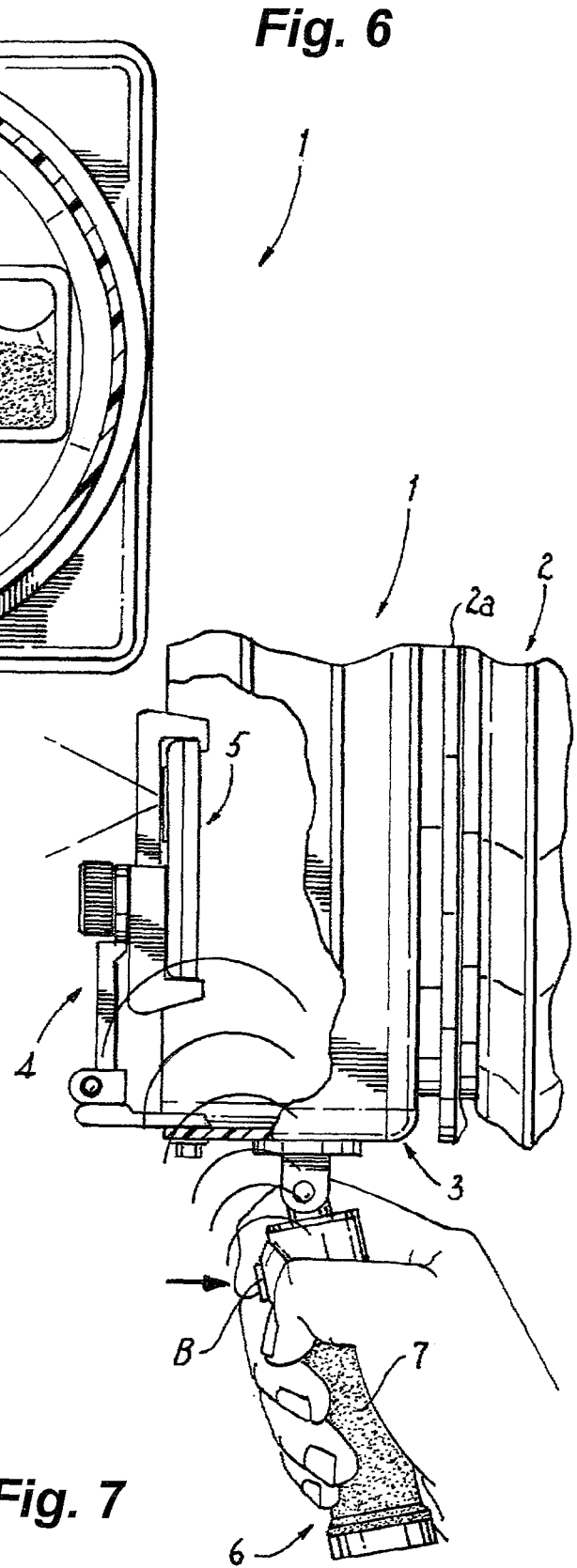
FIG. 7 is a close-up side view of the camera grip handle for actuating Wi-Fi/Bluetooth signals to activate taking images with the smartphone camera, or having a microphone for voice activation of the smartphone camera image taking of still photographs or moving video images.

FIG. 7 shows the side of the camera grip handle for actuating Wi-Fi/Bluetooth signals to activate taking images with the smartphone camera, where the smartphone camera 5 has a built-in microphone M for voice activation of the smartphone camera image taking of still photographs or moving video images.

A ¾ inch to 1 inch nylon flexible strap with parachute clips is affixed to each 2-inch side to secure the headband device 101a, 101b around the head of the user/wearer.

Figure 8:
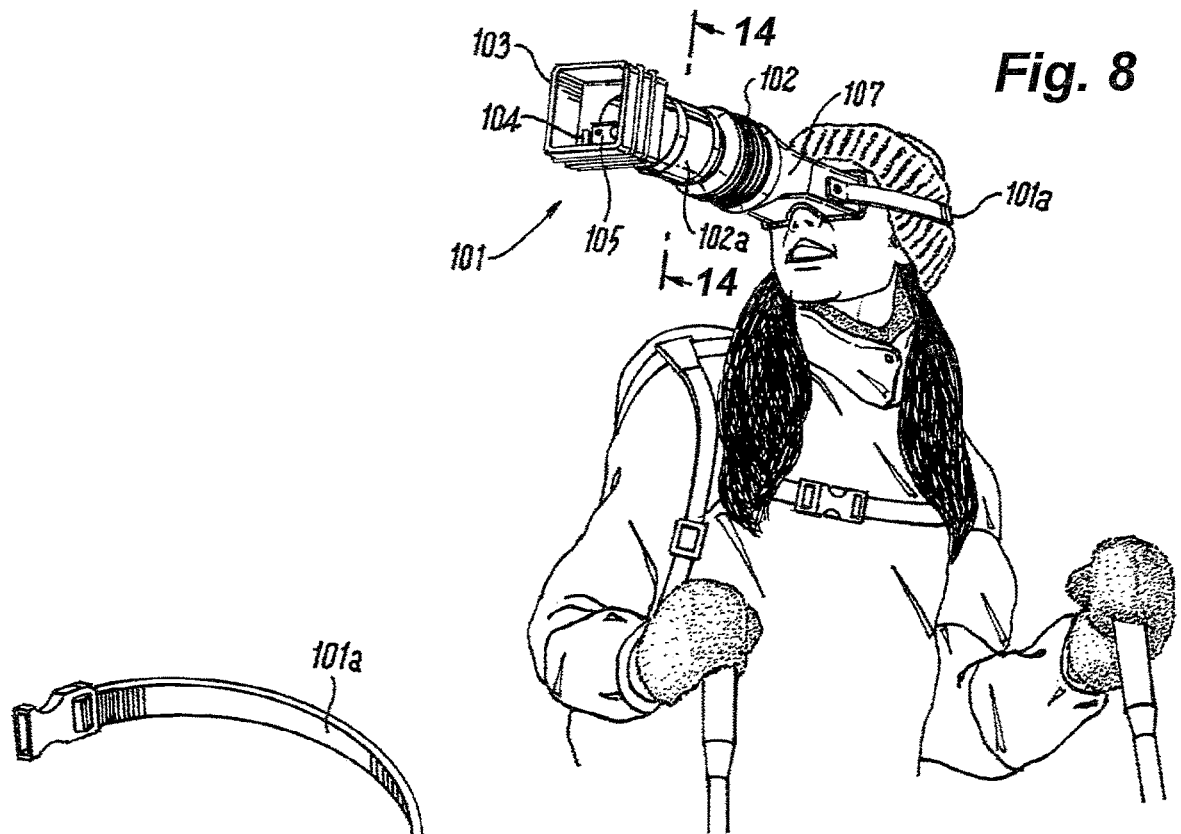
FIG. 8 is a perspective view, of an alternate embodiment for a headband support, showing a hiker in the woods, wearing the anti-glare shield with a wearable action camera, such as a :Go Pro" camera positioned therein.

FIG. 8 shows an alternate embodiment for a headband 101a, 101b supported anti-glare apparatus 101, showing a hiker in the woods. Optionally the video imagery can be captured via voice commands through the built-in microphone "M" of the wearable action camera 105.

FIG. 8 also shows the user wearing the anti-glare apparatus 101 having a two-part headband 101a, 101b, supporting a wearable action camera 105 (such as a "GoPro" wearable action camera) where the headband 101a, 101b supports a cantilevered flexible, opaque, corrugated, expandable and retractable pipe shield 102 with collar 102a extending outward therefrom. At the distal end of the flexible cantilevered flexible, opaque, corrugated, expandable and retractable pipe shield 102 having a collar 102a, there is provided a frame 103 with a clamp 104 having a ledge "L" for holding a head worn wearable action camera 105, such as a "Go Pro" action video camera positioned in the frame 103 by a clamp 104 having a ledge "L" for supporting the head wearable action camera 105 positioned thereon. Viewing goggles 107 for the user are located at the proximal end of the flexible, corrugated, expandable pipe shield 102. The operation of the wearable action camera 105 can be activated by a button "B", or by voice activation with a built-in microphone "M" of the wearable action camera 105, which is normally used to record audio associated with the video images taken with the GOPRO®, or other wearable action camera 105. If the audio output needs to be stronger to activate the wearable action camera 105, an auxiliary microphone "M" can be provided in the headband 101a worn by the user.

Figure 9:
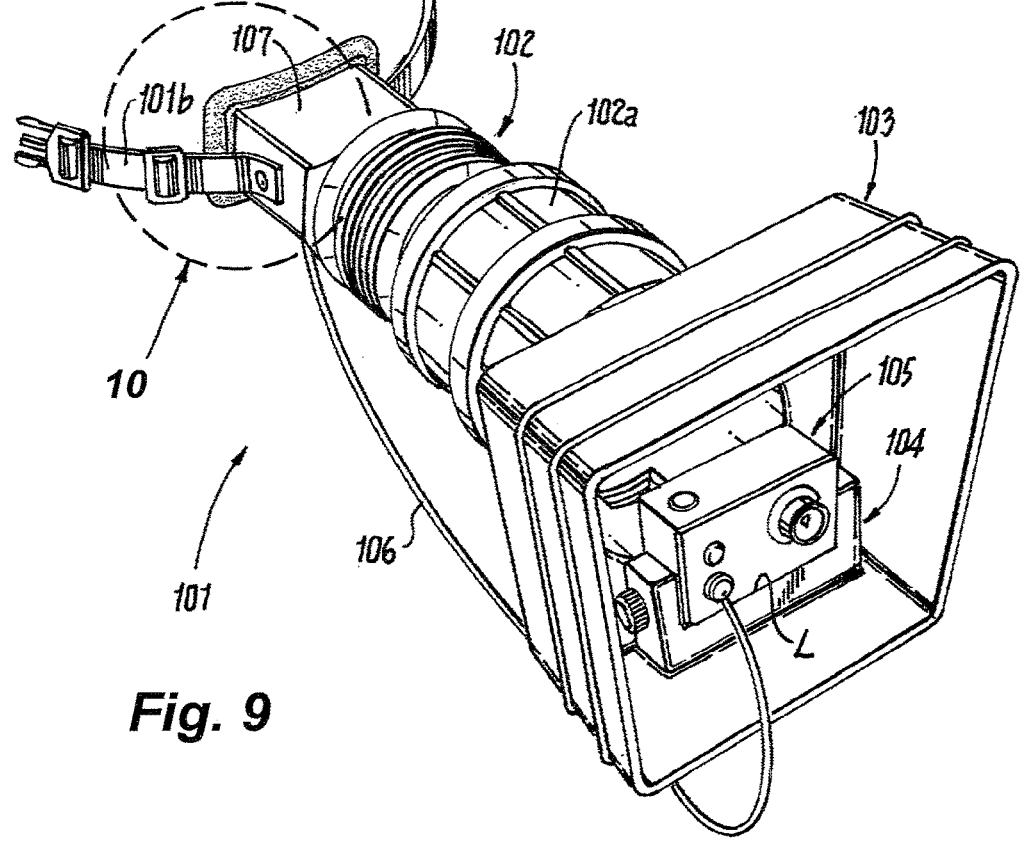
FIG. 9 is a perspective view of the headband supporting the anti-glare shield of FIG. 8, showing the headband being two joinable straps, which are joined by a fastener (which are well known in the art as parachute clips), where the fastener includes a receptacle on one of the headband straps. The fastener also includes a prong on the other of the headband straps. When joined, the two straps of the headband form a single headband around the head of the user to support the glare-reducing pipe shield, having the wearable action camera at the distal end of the pipe shield.

FIG. 9 shows the headband 101a supporting the cantilevered flexible, opaque, corrugated, expandable and retractable pipe shield 102 with collar 102a, at the proximal end thereof, of the anti-glare apparatus 101 of FIG. 8. A set of eye goggles 107 are also attached for the eyes of the viewer at the proximal end of the flexible, opaque, corrugated, expandable and retractable pipe shield 102, which is attached at pipe shield collar 102a to camera holding frame 103, having clamp 104, for holding the wearable action camera 105 therein.

FIG. 9 also shows the opaque flexible, corrugated pipe shield 102 being attached at its proximal end near the user viewer, to user viewable goggles 107. Additionally, FIG. 9 shows the headband being two joinable straps 101a, 101b, which are joined together by a fastener, where the fastener includes a receptacle 108a on one of the headband straps 101a. The fastener also includes a prong 108b on the other strap 101b of the headband straps 101a, 101b. When joined, the two straps 101a, 101b of the headband form a single headband around the head of the user to support the glare-reducing pipe shield 102, having the wearable action camera 105 at the distal end of the pipe shield 102. FIG. 9 also shows a lasso-type tether 106 to protect the camera 105 from being lost if it is dislodged from the clamp 104 of the distal frame 103. The tether 106 is attached conveniently to the user's headband 101a, 101b, or other wearable garment.

Figure 10:
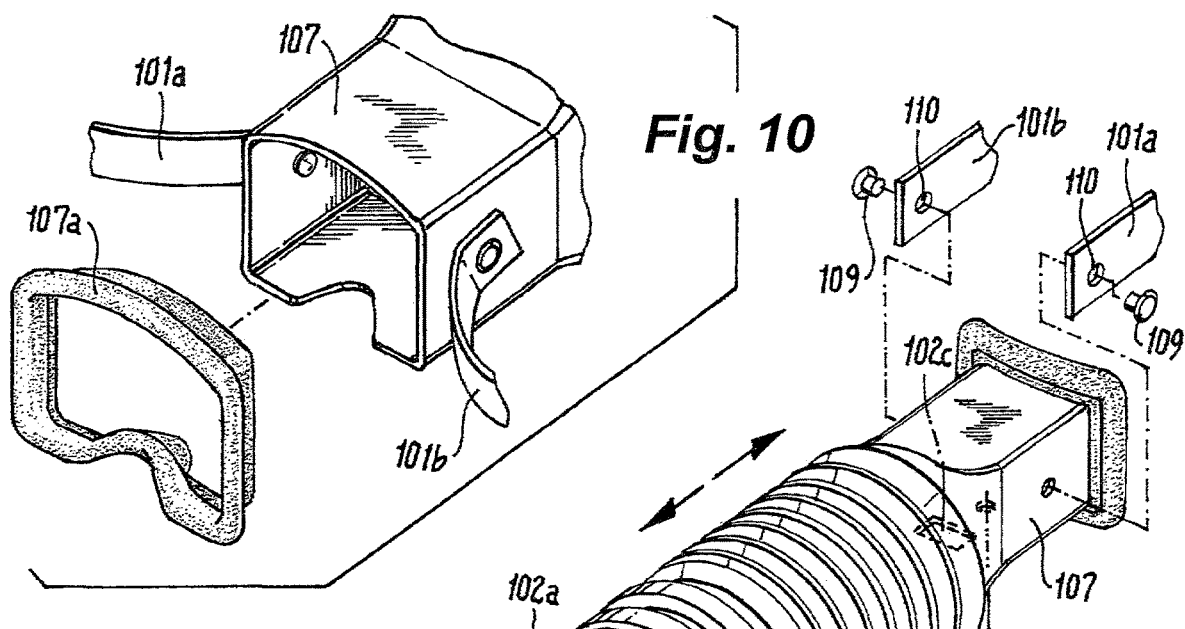
FIG. 10 shows close up details of the cushion of the goggles at the proximal end of the hollow pipe shield, and portions of the headband straps for the head worn glare-reducing shield of FIGS. 8 and 9 from the front distal end showing optional viewing by the user using goggles to protect the user's eyes while traveling fast and recording a continuous video of what the user sees in the camera screen while moving fast.

FIG. 10 shows the head worn anti-glare apparatus 101 of FIGS. 8 and 9 from the front distal end thereof, showing the optional viewing user goggles holder 107 with a cushioned edge 107a for the user to rest his or her forehead and eye sockets there upon. FIG. 10 also shows headband straps 101a, 101b, as in FIGS. 8 and 9.

Figure 11:
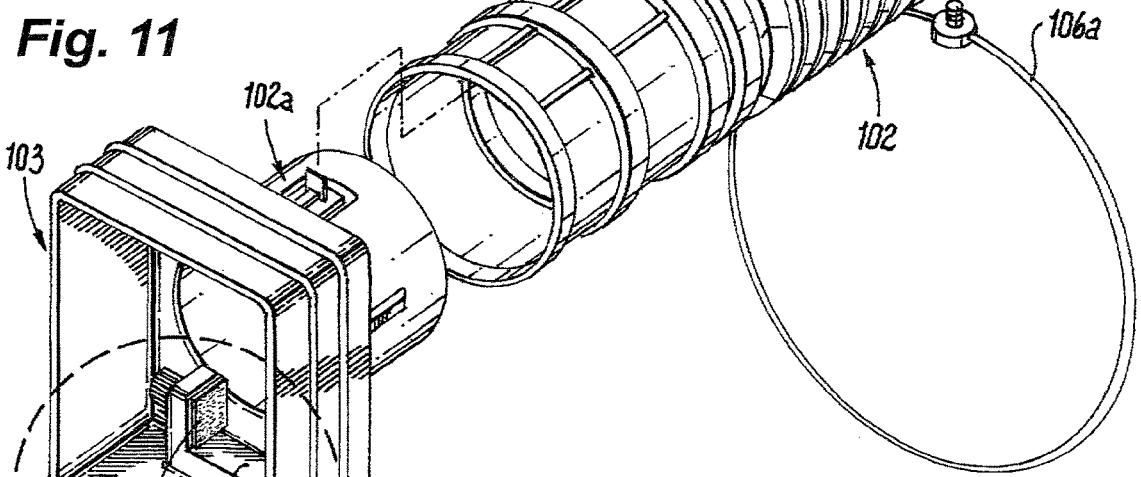
FIG. 11 is a front exploded view, showing the components of the flexible, opaque bellows glare-reducing shield and camera holding frame of FIGS. 8-10 with a wearable action camera positioned therein.

FIG. 11 shows the components of the anti-glare apparatus 101 including the flexible, opaque bellows glare-reducing shield 102 and camera holding frame 103 of FIGS. 8-10, with a wearable action camera 105 positioned therein upon a ledge "L" of clamp 104 of frame 103. Clamp 104 includes the horizontal ledge "L", but also upwardly extending walls 104a and 104b on each side of the clamp 104 to securely hold the camera 105 therein. An optional neck lanyard tether 106a is provided to additionally support the anti-glare apparatus 101 upon the neck and shoulders of the user.

Figure 12:
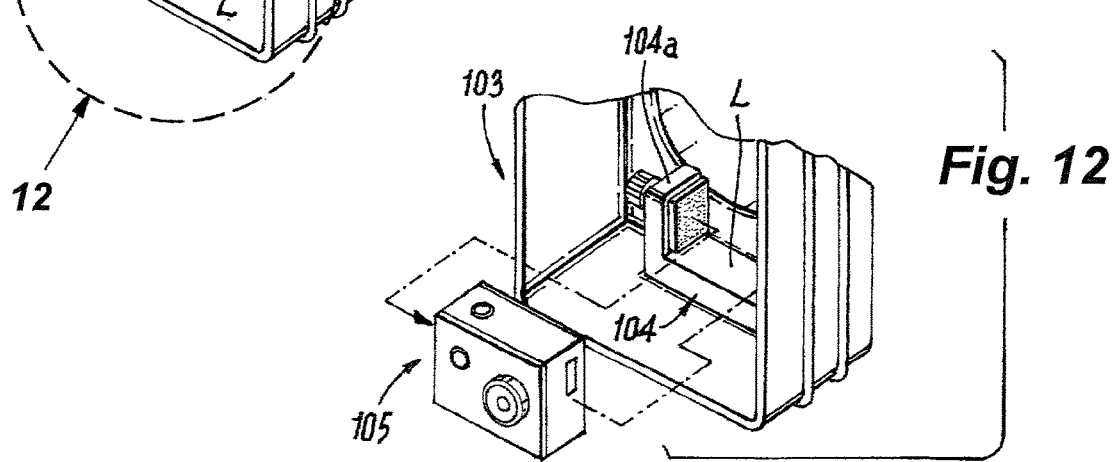
FIG. 12 is a close-up detail view of a corner of the wearable action camera holding frame of FIGS. 8-10, showing the locking elements of a clamp within the frame for securely holding the wearable action camera in place.

FIG. 12 shows in a close-up detail view, the corner of the wearable action camera holding frame 103 of FIGS. 8-10 and shows the locking elements of clamp 104 for securely holding the wearable action camera 105 in place, cantilevered outward from the user's head worn headband 101a, 101b. FIG. 12 also shows a compressible fastener pad "P" on each of the upwardly extending arms 104a, 104b of FIGS. 9, 10, and 11.

Figure 13:
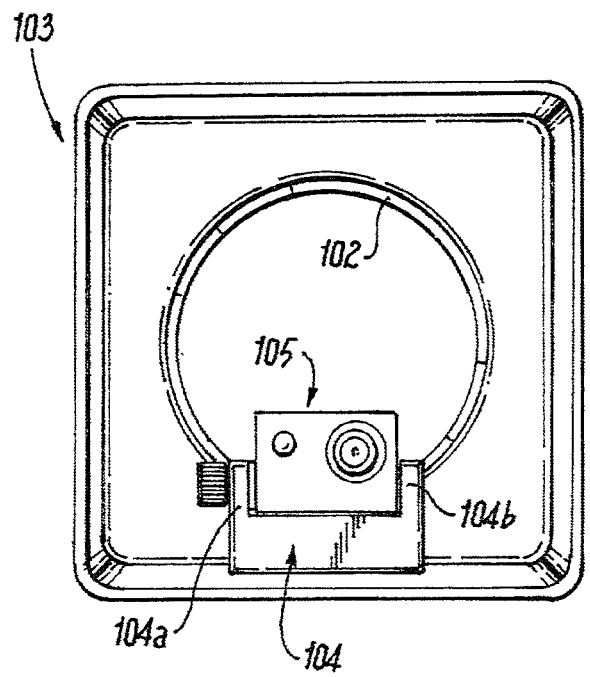
FIG. 13 is a front elevation view, showing the wearable action camera of FIGS. 8-13 being held in the camera holding frame, adjacent to the distal end of the flexible, opaque bellows glare shield, which extends cantilevered from a user's headband attachment for viewing scenes therethrough.

FIG. 13 shows the wearable action camera 105 of FIGS. 8-12 being held in the camera holding frame 103, adjacent to the distal end of the flexible, opaque bellows expandable and retractable pipe shield 102, which extends cantilevered from a user's headband 101a via an attachment for viewing scenes to be photographed or videoed therethrough. FIG. 13 is a front elevation view, showing the wearable action camera 105 of FIGS. 8-13 being held by the clamp 104, including upwardly extending arms 104a, 104b and pads "P", in the camera holding frame 103, adjacent to the distal end of the flexible, opaque, corrugated, expandable and retractable bellows pipe glare-reducing shield 102, which extends cantilevered from a user's headband attachments 101a, 101b having goggles 107 for viewing scenes therethrough.

Figure 14:
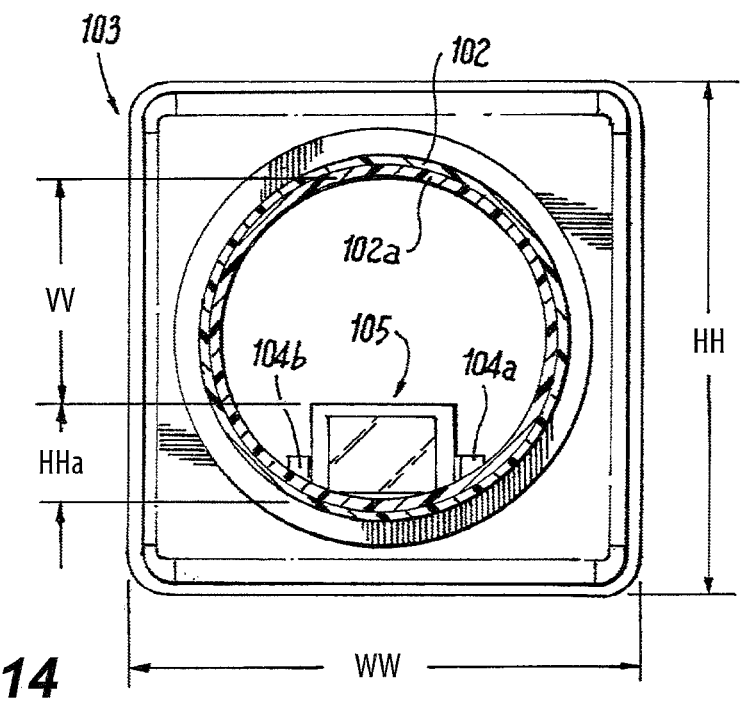
FIG. 14 is a sectional elevation view of the wearable action camera shown in FIG. 13, showing the inside of the flexible, opaque bellows glare-reducing shield and the wearable action camera positioned with a camera holding frame outside of the distal end of flexible, opaque bellows glare-reducing shield, or the glare-reducing shield of FIGS. 8-13.

FIG. 14 shows the inside of the flexible, opaque bellows, expandable, retractable pipe shield 102 and the wearable head wearable action camera 105 positioned with a clamp 104 of the camera holding frame 103, located outside of the distal end of flexible, opaque bellows expandable, retractable pipe shield 102 of FIGS. 8-13.

Additionally, as shown in FIG. 14, for safety reasons, there must be an unobstructed view in the field of view shown in the pipe shield 102, so that the wearer/user can see above the top of the wearable action camera 105 and have a clear view of any obstacles in his/her path during use of the wearable action camera 105.

FIG. 14 also shows the wearable action camera 105, shown in FIG. 13, showing the inside of the flexible, opaque bellows glare-reducing shield 102, and its attachment collar 102a. The wearable action camera 105 is positioned within the camera holding frame 103 outside of the distal end of flexible, opaque bellows glare-reducing shield 102. FIG. 14 also shows the wearable action camera 105, such as a "GoPro" camera, or the like, mounted on a ledge "L" outside of the circular field of view of 3½ inches, so that when positioned on the ledge "L", the camera screen is visible in the lower sector of the 3.5 inch circular viewing field, but that the top of the wearable action camera 105 still leaves a wide open viewing area that is 2.1 inches in height, to provide the user/viewer with an unobstructed view "WV" of a sector of the circular viewing area above the top of the "GoPro" camera. When larger diameter pipe shields are used, then the wide-open viewing area "V" will be more than the minimally safe open viewing area of 2.5 inches in height.

Therefore, FIG. 14 shows the action head mounted camera 105, such as a "GoPro" camera, or the like, mounted within a frame 103 having a width "WW" of about 5½ inches and a height "HH" of about 5½ inches, where the camera 105 is mounted on a ledge "L" outside of the circular field of view of 3½ inches, so that when positioned on the ledge "L", the camera screen of the wearable action camera 105 is visible for about ¾ of an inch above ledge "L", in the lower sector "WW" of the 3.5 inch circular viewing field, but that above the top of the action camera 105 there is provided a wide open viewing area geometric sector "VV" at its highest point of the circular sector, that is 2.1 inches in height, to provide the user/viewer with an unobstructed view of a the circular sector viewing area "VV" above the top of the action camera 105, such as a "GoPro" camera. The top line of the wearable action camera 105 provides a flat geometric chord line forming the bottom of the unobstructed viewing sector area "VV".

FIGS. 15 and 16 show an alternate embodiment of a user conducting an on-going activity, such as skateboarding, user using the anti-glare apparatus 201 with the flexible, opaque bellows corrugated pipe shield 202, having the wearable action camera 205 being held within the clamp 204, located within the distal end of the flexible, tubular bellows-type pipe shield 202, while the skateboarder is moving on a skateboard and taking live action videos with the wearable action camera 205. The wearable action camera 205 is activated for video imagery, prior to the activity and allowed to video until the activity is ceased. The video capturing can be controlled remotely via Wi-Fi or Bluetooth, with an activation finger operable button "B" on the headband 201*a*, 201*b* or on a lasso type flexible cord 206 extending from the headband 201*a*, 201*b* for securing the wearable action camera 205 in place, so that if the wearable action camera 205 becomes dislodged from the ledge "L" of the clamp 204, the flexible lasso cord 206 can keep the dislodged wearable action camera 205 in the retrievable vicinity of the anti-glare apparatus 201. The lasso cord 206 can be attached securely to the headband 201*a*, 201*b*, or to a harness worn by user, so that the wearable action camera 205 can be retrieved if dislodged from ledge "L" of the clamp 204 of the anti-glare apparatus 201.

Additionally, FIG. 15 shows a pipe shield 202 with two different types of flexible corrugations, which can be assembled by making the pipe shield 202 from two separate removable or attachable corrugated pieces.

FIG. 17 shows an alternate embodiment, where the camera 305 of the anti-glare apparatus 301 is attached by a hook and loop (VELCRO®) fastener 304 directly within the distal end of the flexible pipe shield 302, for less rigorous activities.

FIG. 18 is an alternate embodiment for an anti-glare apparatus 401, where the flexible pipe shield 402 has a noncylindrical cross section to hold the camera 405 within the clamp 404, such as a square cross section or other geometric cross-sectional shape.

FIG. 19 is an alternate embodiment for an anti-glare apparatus 501, using the handheld embodiment of FIGS. 1-7 herein, but where the user wants to take a close-up photograph or video with the camera 505, located in clamp 504 of frame 503, of a skittish or dangerous animal, such as a butterfly or snake. Therefore, in FIG. 19, a removably attachable handle 506*a* with a Bluetooth camera activation button "B" is provided at the proximal end of the handheld glare reducing apparatus shield 502, spaced apart from the front of the apparatus 501, near the dangerous animal. While FIG. 19 shows the auxiliary proximal handle 506*a*, near the body of the user, and the original handle 506, located at the distal end of pipe shield 502, it is assumed that the anti-glare device 501 could have one or both handles 506, 506*a* either permanently attached or removably attached to the anti-glare apparatus 501.

FIG. 20 is a perspective view of further alternate embodiment 601 having an auxiliary slidable, pivotable visor 620 that can slide forward from a visor frame 622 mounted above the camera 505, to block any direct sunlight near the location of the camera 505 at the distal end of the opaque, flexible, compressible pipe shield 502, which is shown mounted upon the embodiment depicted in FIG. 19. The visor 620 of FIG. 20 may be used to combat glare when the user angles the camera 505 down in the clamp 504, thus potentially exposing the camera viewer window to light as it is outside of the enclosure of the opaque, flexible, compressible pipe shield 502. The visor has side rails 621 engageable with channel tracks 623 located on the inside of the visor frame 622. Optionally the visor 620 could have channels and the frame 622 could have rails. The extended visor 620, slidable forward from its support visor frame 622 provides shade over the exposed window, allowing the photographer to see his subject in the view window of the camera screen of camera 505.

The various embodiments for anti-glare devices 101, 201, 301, 401, 501 and 601 open a whole new universe of photography. For example, by flexing the opaque corrugated pipe shield 2, 102, 202, 302, 402, or 502, it is possible to video or still photograph around the corner of a building. Currently, the field of view for head wearable action cameras 105 is very wide, about 120-140 degrees to include everything. With the narrow field of view of the present invention with the photographer looking solely at the object desired to photograph, a many times larger image is recorded. There is no need to take a conventional wide-angle picture and crop.

Down to capturing the image, with the anti-glare apparatus of the present invention, the photographer now has a large image of colossal compositional flexibility.

The various inventive anti-glare apparatus' 1, 101, 201, 301, 401, 501 and 601 are extremely useful for nature and wildlife photographers who can extend the opaque corrugated pipe shield 2, 102, 202, 302, 402, and 502 holding the smartphone camera 5 or wearable action camera 105, 205, 305, 405, 505 to a distance which is safer and more usable. For example, the Applicant herein photographed a six-foot gigantic Moray eel and was almost bitten. By using the inventive embodiment of the anti-glare apparatus 501, shown in FIG. 19, the user herein would be able to remain at a safer distance away from the dangerous subject being photographed or videoed.

The head wearable anti-glare apparatus 101, 201, 301, 401, or 501 with the wearable action cameras 105, 205, 305, 405, or 505, iteration is extremely well suited for underwater photography, optionally with strap on headband pieces.

The inventive anti-glare apparatus' 1, 101, 201, 301, 401, and 501 are superb for flower photography and macro photography by maintaining a greater distance from the user to the flower thus eliminating many shadows.

The inventive anti-glare apparatus' 1, 101, 201, 301, 401, and 501 are also useful by extending the opaque, expandable or retractable corrugated pipe shield 2, 102, 202, 302, 402, or 502 for examining industrial machinery.

The flexible, opaque corrugated pipe shield 2, 102, 202, 302, 402, or 502 can be tilted up by pivoting at the joint where it meets the handle 7 of the camera grip 6, or from the headband 101*a*, 101*b*, to photograph the night sky and stars. Other hard to reach places: car repair, furnishing installation equipment, military, etcetera can use the anti-glare apparatus' 1, 101, 201, 301, 401, or 501.

The inventive handheld anti-glare apparatus 1 is also useful to allow smartphone users to sit on a bench in the sun and read or work on their smartphones 5.

The inventive apparatus 1 improves reading on the smart phone 5 by making whatever is on the phone 5 clearer and more distinct and easier to see and observe glare free.

The anti-glare apparatus' 1, 101, 201, 301, 401, and 501 may also include a 6×6×6 diameter downspout adaptor to which a compressible, flexible, HVAC (heating, ventilation, air conditioning) 6-inch tubing is attached to the round end of the downspout adaptor with a stainless-steel clamp. A camera handgrip such as a camera grip post 6 is attached on the outside of the downspout adaptor, which acts as the flexible, opaque, corrugated pipe shield 2. The outside of the downspout adapter can also attach directly to the headband 101*a*, 101*b* and goggles 107 associated with the wearable action camera 105. Inside the 6×6×6 downspout adaptor on the bottom is a metal phone tripod mount attached with a ¼-inch bolt to hold the smartphone 5, wearable action camera 105 or other photographic device. The smartphone holder frame 3, 103, 203, 303, 403 or 503 may each have a pivot to swing the camera 105, 205, 305, 405, or 505 out of the clamp 4, 104, 204, 304, 404 or 504 for camera positioning adjustments. For example, the Amarok Phone Holder is pivotable. There are many other smartphone holders suitable for the invention offered on Amazon. The Applicant herein has an Apple iPhone 14 Pro Max which just barely fits into the opening. Other smartphones or photographic devices which are smaller can easily fit in. If necessary, a larger downspout adapter can be made and used as the flexible, corrugated pipe shield 2, 102, 202, 302, 402, or 502. There are thousands and thousands of downspout adapters currently in use in the US and they are manufactured by injection molding very quickly. The user of the glare resistant apparatus 1, 101, 201, 301, 401, or 501 merely has to insert the smartphone camera 5 or the wearable action camera 105, 205, 305, 405, or 505 into the clamp 4, 104, 204, 304, 404, or 504 of the frame 3, 103, 203, 303, 403, or 503, pick up the assembled apparatus device 1 with the handle 6, of FIGS. 1-7 and 19-20, or don the headband of FIGS. 8-18 and use. For the flexible, opaque expandable and retractable corrugated pipe shield 2, 102, 202, 302, 402, or 502 a flexible 6" or 7" corrugated HVAC pipe is extended or retracted extremely rapidly.

For the user's visual acuity, one purpose of the expandable and retractable telescoping object of the anti-glare apparatuses of the present invention is to custom fit the specific eye characteristics of the photographer. Whether the user is near sighted, far sighted, uses contact lenses, glasses, all can be adjusted by the expandable and retractable telescoping feature of the anti-glare apparatuses of the present invention. The expandable and retractable telescoping feature of the present invention allows the user the ability to adjust the telescoping to the time of day or light conditions. For example, it is thought at 12 noon, with the sun directly overhead, the telescoping and the expandable and retractable pipe shields would not require much extension, but moreover by early morning or late afternoon when the sun is at a sharp angle more extension of the flexible, opaque corrugated HVAC pipes would be required.

As noted above, one iteration of the invention is an apparatus which includes essentially of a PVC downspout adapter pipe (tradename: "5×5×4", which means the first two numbers are the upper width and length, in inches, and the last number is the diameter, in inches, of the pipe).

In one example, the "5×5×4" downspout adapter forming the flexible, opaque, corrugated pipe shields, are joined to a FLEX-DRAIN® piping, having dimensions of 2×3×4 inches of the flexible downspout adapter, and an expandable small downspout adapter. The 4-inch pipe opening from the 5×5×4 inch downspout adapter plugs into the 4-inch hole on the flexible downspout adapter. The thus formed pipe shield can be expanded from 8.5 inches to 12.5 inches in length, due to its corrugated, compressible, and retractable corrugated shape. There are lightweight, quick PVC couplings to add increased length, or cut to shorten the adapter. A "GoPro" or other wearable action camera is installed on the inside ledge "L" of the 5×5×4 downspout adapter, forming the frame for holding the wearable action camera adjacent to the distal end of the flexible adapter forming the flexible, opaque, corrugated pipe shield of the embodiment shown in drawing FIGS. 8-18 herein.

This expansion can be increased by manufacturing more corrugated, expandable, and retractable bellows type folds. The purpose of the expansion or contraction is bespoken to the individual eyesight of each user, as there is considerable variability with eyesight.

Also in the downspout adapter embodiment, the wearable, action camera, such as a "GoPro Hero 11" head wearable action camera or the like, is installed on the bottom, 5-inch side of the downspout adapter. There is a ¾ inch ledge "L" to position and seat the wearable action camera thereon, so that the bottom edge of the camera screen touches the perimeter of the 3.5-inch opening of the pipe shield.

As can be seen in the drawing FIGS. 1-20, an enormous amount of unobstructed viewing area above the viewing screen of the wearable action camera, to the top of the 3.5-inch opening of the flexible, opaque, corrugated pipe shield, is revealed. At the least, the dimensions are greater than the viewing screen on the "GoPro Hero 11" camera alone. This area of an unencumbered view V promotes safety as the photographer has a very broad field of view, or point of view. The Applicant herein experimented with several downspout adapters before arriving at the desirable 5×5×4 downspout adapters. All were unsatisfactory for various reasons. The 6×6×6 downspout adapter is possible to use, but it requires a lot of new engineering to make it practical for use.

A major inventive step is placing the eyeball of the photographer directly behind the display screen in real-time, moment to moment of the head wearable action camera. The eyeball of the user, the wearable action camera, and display screen thereof are one which move, see, and record in any direction together, which is a groundbreaking, game changing advance. GOPRO® discloses an estimate of 30 mounts for "GoPro" cameras to make a wearable action camera. None of them place/tie the eyeball to the display screen in real-time, moment to moment. As previously noted, the closest state of the art, "Head Strap 2.0", fits the camera around the top of the head of the user, which can be seen in the Head Strap 2.0 website. Additionally, the top of the head of the photographer is not the eye of the photographer, so the photographer is unable to see what the camera sees. The B&H PHOTO VIDEO® Electronics and Camera Store, and other manufacturers of mounts for head wearable action cameras, have dozens of mounts that do not connect the photographer's eyeball view to the display screen in real-time, moment to moment.

So far as it is known, there are no mounts or wearables for head wearable action cameras which connect the photographer's eyeball view to the display screen thereof. In the Applicant's present invention, where the head goes, the display screen of the wearable action camera goes. The neck of the photographer has an infinite number of angles for the display screen of the wearable action camera in Applicant's anti-glare apparatuses to document and photograph.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. An apparatus for reducing glare in, and protecting, a camera against weather during use thereof comprising:
   a camera holder holding said camera;
   said camera holder having a clamp for supporting said camera within said camera holder;
   said camera holder adapted for accommodating a user to utilize said camera to photograph an object appearing on a viewing screen of said camera through an opening of said camera holder;

a compressible/expandable pipe shield attached with a collar at a distal end thereof to said opening of said folder for reducing glare in said camera coming from all sides while allowing said user to watch said viewing screen on said camera through a proximate end of said pipe shield; and a viewing field from said proximate end of said compressible/expandable pipe shield comprising said viewing screen of said camera and a field surrounding said camera.

2. The apparatus of claim 1 in which said compressible/expandable pipe shield is corrugated.

3. The apparatus of claim 1 in which said camera is part of a smartphone.

4. The apparatus of claim 1 in which said camera is a wearable action camera.

5. The apparatus in claim 4 wherein the eyeball of the user, said wearable action camera, and said display screen jointly move, see, and record in any direction together.

6. The apparatus of claim 1 in which said compressible/expandable pipe shield is a corrugated flexible and compressible polyethylene polypropylene downspout adapted for use with said camera.

7. The apparatus of claim 1 having a downwardly extending handle enabling a user to hold said camera holder while using said camera.

8. The apparatus of claim 7 in which handle incorporates a camera grip adjacent said distal end of said of said compressible/expandable pipe shield.

9. The apparatus of claim 8 in which said camera grip includes Wi-Fi/Bluetooth capability to activate taking still and video images with a smartphone camera.

10. The apparatus as in claim 9 having a microphone for voice activation of the Wi-Fi/Bluetooth capability, and for taking video.

11. The apparatus as in claim 1 wherein said camera holder is a frame having a front opening and a rear opening;

said frame having said clamp of said camera holder for supporting said camera within said frame between said front and rear openings thereof;

said rear opening adapted for accommodating a user to utilize said camera to photograph an object appearing on a viewing screen of said camera through said rear opening of said frame.

12. The apparatus as in claim 1 wherein said camera holder is located within a distal end of said compressible/expandable pipe shield, said camera holder having said clamp for supporting said camera within said compressible/expandable pipe shield between said front and rear openings thereof;

said rear opening of said camera holder adapted for accommodating a user to utilize said camera to photograph an object appearing on a viewing screen of said camera through said rear opening of said compressible/expandable pipe shield.

13. The apparatus of claim 1 in which said camera holder and compressible/expandable pipe shield are mounted on a headband with a wearable action camera.

14. The apparatus as in claim 1 further comprising an auxiliary slidable, pivotable visor, said visor slidable forward from a visor frame mounted above said camera, to block any direct sunlight near said camera, said camera located at the distal end of said compressible/expandable pipe shield, said visor usable to reduce glare when the user angles said camera down in said camera holder, thus potentially exposing the camera viewer window to light as a portion of said camera may be outside of the enclosure of said compressible/expandable pipe shield, said visor providing shade over the exposed portion of said camera, allowing the user to see his or her subject in the view window of the camera screen of said camera.

15. A method for reducing glare in, and protecting, a camera against weather during use thereof comprising the steps of:

providing a camera holder having a front opening and a rear opening;

providing said camera holder with a clamp for supporting said camera within said camera holder between said front and rear openings thereof, said rear opening accommodating a user to utilize said camera to photograph an object appearing through said rear opening of said camera holder;

attaching a distal end of a compressible/expandable pipe shield with a collar to said rear opening of said camera holder for reducing glare in said camera coming from all sides while allowing said user to watch a viewing screen on said camera through a proximate end of said compressible/expandable pipe shield, said user holding said camera holder with said attached compressible/expandable pipe shield to look through said proximate end of said compressible/expandable pipe shield to see said viewing screen of said camera and a field surrounding said camera; and operating said camera to take photographs and video.

16. The method of claim 15 in which compressible/expandable said pipe shield is corrugated.

17. The method of claim 15 in which said camera is part of a smartphone.

18. The method of claim 15 in which said camera is a wearable action camera.

19. The method of claim 15 in which said compressible/expandable pipe shield is a corrugated flexible and compressible polyethylene polypropylene downspout adapted for use with said camera.

20. The method of claim 15 in which said camera holder is provided with a downwardly extending handle enabling a user to hold said frame while using said camera.

21. The method of claim 20 in which said handle incorporates a camera grip adjacent said distal end of said of said compressible/expandable pipe shield.

22. The method of claim 21 in which said camera grip includes Wi-Fi/Bluetooth capability to activate taking images with a smartphone camera, having a microphone for voice activation, and taking video.

23. The method as in claim 22 having a microphone for voice activation of the Wi-Fi/Bluetooth capability, and for taking video.

24. The apparatus as in claim 15 wherein said camera holder is a frame having a front opening and a rear opening;

said frame having said clamp of said camera holder for supporting said camera within said frame between said front and rear openings thereof;

said rear opening adapted for accommodating a user to utilize said camera to photograph an object appearing on a viewing screen of said camera through said rear opening of said frame.

25. The apparatus as in claim 15 wherein said camera holder is located within a distal end of said compressible/expandable pipe shield, said camera holder having said clamp for supporting said camera within said compressible/expandable pipe shield between said front and rear openings thereof;

said rear opening of said camera holder adapted for accommodating a user to utilize said camera to photograph an object appearing on a viewing screen of said camera through said rear opening of said compressible/expandable pipe shield.

26. The method of claim 15 including the step of mounting said camera holder and said compressible/expandable pipe shield on a headband with a wearable action camera.

27. The method as in claim 26 wherein the eyeball of the user, said wearable action camera, and said display screen jointly move, see, and record in any direction together.

28. The method of claim 15 further comprising the step of providing an auxiliary slidable, pivotable visor, said visor slidable forward from a visor frame mounted above said camera, to block any direct sunlight near said camera, said camera located at the distal end of said compressible/expandable pipe shield, said visor usable to reduce glare when the user angles said camera down in said camera holder, thus potentially exposing the camera viewer window to light as a portion of said camera may be outside of the enclosure of said compressible/expandable pipe shield, said visor providing shade over the exposed portion of said camera, allowing the user to see his or her subject in the view window of the camera screen of said camera.

* * * * *